United States Patent
Kim et al.

(10) Patent No.: US 9,049,636 B2
(45) Date of Patent: *Jun. 2, 2015

(54) APPARATUS AND METHOD OF TRANSMITTING AND RECEIVING DATA IN SOFT HANDOFF OF A WIRELESS COMMUNICATION SYSTEM

(71) Applicant: LG ELECTRONICS INC., Seoul (KR)

(72) Inventors: Ki Jun Kim, Anyang-si (KR); Byung Kwan Yi, San Diego, CA (US); Sang Gook Kim, San Diego, CA (US); Dong Wook Roh, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 160 days.

This patent is subject to a terminal disclaimer.

(21) Appl. No.: 13/756,997

(22) Filed: Feb. 1, 2013

(65) Prior Publication Data

US 2013/0148631 A1   Jun. 13, 2013

Related U.S. Application Data

(63) Continuation of application No. 12/563,435, filed on Sep. 21, 2009, now Pat. No. 8,369,214.

(60) Provisional application No. 61/099,207, filed on Sep. 23, 2008, provisional application No. 61/105,032, filed on Oct. 13, 2008, provisional application No. 61/109,908, filed on Oct. 30, 2008.

(30) Foreign Application Priority Data

Jul. 17, 2009   (KR) .................. 10-2009-0065308

(51) Int. Cl.
    *H04W 36/00*   (2009.01)
    *H04W 36/18*   (2009.01)
    (Continued)

(52) U.S. Cl.
    CPC ............. *H04W 36/18* (2013.01); *H04L 1/0041* (2013.01); *H04L 1/0059* (2013.01);
    (Continued)

(58) Field of Classification Search
    None
    See application file for complete search history.

(56) References Cited

U.S. PATENT DOCUMENTS 5,978,365 A   11/1999   Yi
6,009,328 A   12/1999   Muszynski
(Continued)

FOREIGN PATENT DOCUMENTS

CN   1302494   7/2001
CN   1308821   8/2001
(Continued)

OTHER PUBLICATIONS

State Intellectual Property Office of the People's Republic of China Application Serial No. 200980130162.4, Office Action dated Aug. 19, 2013, 5 pages.

(Continued)

*Primary Examiner* — Hassan Phillips
*Assistant Examiner* — Duc Duong
(74) *Attorney, Agent, or Firm* — Lee, Hong, Degerman, Kang & Waimey

(57) ABSTRACT

The present invention relates to a method of transmitting and receiving data in soft handoff of a wireless communication system. According to an aspect of the present invention, in the method of receiving data in soft handoff of a wireless communication system, a mobile station receives a first sequence being generated by interleaving transmission data using a first inter leaver pattern, and also receives a second sequence being generated by interleaving the transmission data using a second interleaver pattern. Then, the mobile station combines and decodes the first sequence and the second sequence before receiving an entire frame having the first sequence allocated thereto.

8 Claims, 21 Drawing Sheets

(51) Int. Cl.
 *H04L 1/00* (2006.01)
 *H04L 1/16* (2006.01)
 *H04L 1/18* (2006.01)
 *H04W 28/04* (2009.01)

(52) U.S. Cl.
 CPC ............ *H04L 1/0061* (2013.01); *H04L 1/0067* (2013.01); *H04L 1/0071* (2013.01); *H04L 1/1692* (2013.01); *H04L 1/1858* (2013.01); *H04W 28/04* (2013.01)

(56) References Cited

U.S. PATENT DOCUMENTS

| | | | |
|---|---|---|---|
| 6,728,233 | B1 | 4/2004 | Park et al. |
| 7,133,647 | B2 | 11/2006 | Dent |
| 2003/0067907 | A1 | 4/2003 | Rezaiifar et al. |
| 2004/0152468 | A1 | 8/2004 | Sebire |
| 2004/0218559 | A1 | 11/2004 | Kim et al. |
| 2005/0041589 | A1 | 2/2005 | Kwon et al. |
| 2005/0058154 | A1 | 3/2005 | Lee et al. |
| 2005/0094595 | A1 | 5/2005 | Saifuddin |
| 2005/0201477 | A1* | 9/2005 | Cho et al. ............... 375/260 |
| 2006/0013186 | A1 | 1/2006 | Agrawal et al. |
| 2006/0018282 | A1 | 1/2006 | Kwak et al. |
| 2007/0070926 | A1* | 3/2007 | Bachl et al. ............... 370/310 |
| 2007/0076663 | A1* | 4/2007 | Qi et al. ............... 370/331 |
| 2007/0111747 | A1 | 5/2007 | Lundby et al. |
| 2008/0205374 | A1 | 8/2008 | Qian et al. |
| 2008/0212521 | A1* | 9/2008 | Jou ............... 370/320 |
| 2009/0300458 | A1* | 12/2009 | Black et al. ............... 714/749 |
| 2010/0061332 | A1* | 3/2010 | Kim et al. ............... 370/329 |
| 2010/0091735 | A1 | 4/2010 | Kim et al. |
| 2010/0110878 | A1* | 5/2010 | Frederiksen et al. ......... 370/216 |
| 2011/0022933 | A1* | 1/2011 | Lundby ............... 714/790 |
| 2011/0149716 | A1* | 6/2011 | Cho et al. ............... 370/205 |
| 2013/0010729 | A1* | 1/2013 | Novak et al. ............... 370/329 |

FOREIGN PATENT DOCUMENTS

| | | |
|---|---|---|
| CN | 1154383 | 6/2004 |
| CN | 1192651 | 3/2005 |
| CN | 1701534 | 11/2005 |
| CN | 1728882 | 2/2006 |
| CN | 101002448 | 7/2007 |
| EP | 1596525 | 11/2005 |
| EP | 1622413 | 2/2006 |
| JP | 2002043981 | 2/2002 |
| JP | 2003503863 | 1/2003 |
| JP | 2006050608 | 2/2006 |
| JP | 2008502223 | 1/2008 |
| JP | 2008048093 | 2/2008 |
| KR | 10-2001-0093518 | 10/2001 |
| KR | 10-0360251 | 10/2002 |
| KR | 10-0363968 | 11/2002 |
| KR | 10-2003-0030909 | 4/2003 |
| KR | 10-2006-0013069 | 2/2006 |
| KR | 10-2006-0069870 | 6/2006 |
| KR | 10-0830486 | 5/2008 |
| RU | 2292666 | 1/2007 |
| WO | 2006057195 | 6/2006 |
| WO | 2007/089126 | 8/2007 |
| WO | 2007/111456 | 10/2007 |

OTHER PUBLICATIONS

The State Intellectual Property Office of the People's Republic of China Application Serial No. 200980130342.2, Office Action dated Apr. 2, 2013, 8 pages.

The State Intellectual Property Office of the People's Republic of China Application Serial No. 200980130162.4, Office Action dated Jan. 24, 2013, 7 pages.

* cited by examiner

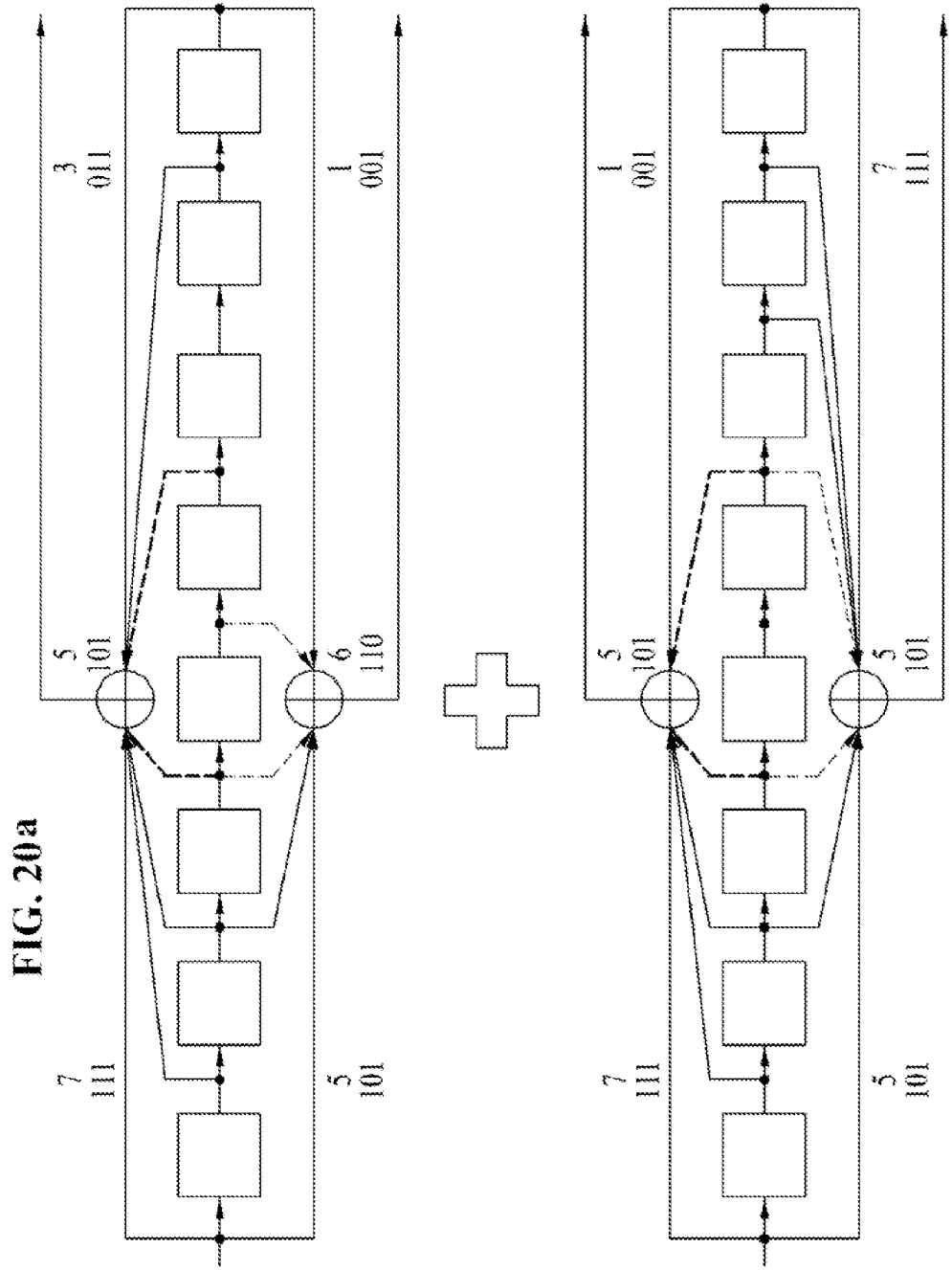

APPARATUS AND METHOD OF TRANSMITTING AND RECEIVING DATA IN SOFT HANDOFF OF A WIRELESS COMMUNICATION SYSTEM

CROSS-REFERENCE TO RELATED APPLICATIONS

This application is a continuation of U.S. patent application Ser. No. 12/563,435, filed on Sep. 21, 2009, now U.S. Pat. No. 8,369,214, which, pursuant to 35 U.S.C. §119, claims the benefit of earlier filing date and right of priority to Korean Patent Application No. 10-2009-0065308, filed on Jul. 17, 2009, and also claims the benefit of U.S. Provisional Application Ser. Nos. 61/099,207, filed on Sep. 23, 2008, 61/105, 032, filed on Oct. 13, 2008, and 61/109,908, filed on Oct. 30, 2008, the contents of all of which are hereby incorporated by reference herein in their entirety.

BACKGROUND OF THE INVENTION

1. Field of the Invention

The present invention relates to a wireless communication system and, more particularly, to an apparatus and a method of transmitting and receiving data in soft handoff of a wireless communication system.

2. Discussion of the Related Art

First of all, a related art power control technique will be described.

Power control in a mobile communication system refers to a technique controlling the power level of a receiving signal in a receiving end, so that the system can be operated to a level required by modulating and coding methods that are adopted according to a transmission rate of transmission data. Particularly, power control relates to resolving a near-far problem that occurs in a reverse link. More specifically, by controlling transmission power of mobile stations so that the transmission power of a mobile station nearer (or closer) to the base station is different from a mobile station further from the base station, the power level of each mobile station received by the base station may be controlled to a specific level.

The mobile station transmits a power signal along with a data signal through a reverse link. Herein, reverse power control is performed by controlling transmission power of a mobile station in a way that the receiving energy of a reverse pilot channel (R-PICH) can be constant. A receiving end of the base station measures the receiving energy of the reverse pilot channel. Then, when the receiving energy is higher than a setpoint, which is a predetermined reference energy level, the receiving end of the base station transmits a DOWN power control bit (PCB) command, which means to lower the transmission power, to the mobile station. And, when the receiving energy is lower than the setpoint, the receiving end of the base station trans-nits an UP power control bit (PCS) command, which means to increase the transmission power, to the mobile station through a forward power control subchannel (F-PCSCH).

Based upon such pilot channel power control, the power control of a reverse traffic channel (R-TCH), wherein data are transmitted through a reverse link, is performed. More specifically, the transmission power of the reverse traffic channel is decided by using a ratio between the transmission power of a pilot channel and the transmission power of a traffic channel (traffic to power ratio, TPR). The TPR for each data rate of the data being transmitted through the traffic channel is pre-decided, and the transmission power of the pilot channel varies in PCS units based upon the reverse link power control. Thus, the relation between the variable transmission power of the pilot channel and the pre-decided TPR decides the transmission power of the traffic channel through which data are transmitted.

Hereinafter, a hybrid automatic repeat request (hereinafter referred to as "HARQ") method and an early termination technique of the related art packet data will now be described in detail.

The HARQ method, which is used in order to enhance the transmission efficiency of packet data that have properties less sensitive to transmission delay, consists of a combination of a conventional forward error correction (hereinafter referred to as "FEC") method and an automatic repeat request (ARQ) method through error detection. The HARQ method is used in connection with a physical layer, and the HARQ method combines the retransmitted data with previously received data, thereby ensuring a high decoding success rate. More specifically, the HARD method corresponds to a method that stores that has failed to be transmitted, instead of discarding the transmission-failed packet, which is then combined with the retransmitted data, thereby being decoded.

According to the HARQ method, the transmitting end FEC-codes data packet information, so as to divide the coded bits into a plurality of sub-packets and transmit the sub-packets. A sub-packet may decoded by using a single sub-packet and has a structure indicating transmission success/failure. Also, the receiving end combines the sub-packet of an identical packet previously received with the currently received sub-packets and decoded the combined packets, so as to verify the success or failure of the transmission. After the transmission of the first sub-packet, the transmitting end receives an acknowledgement (ACK/NACK) from the received end. Then, if the acknowledgement is a negative acknowledgement (hereinafter referred to as "NACK"), another sub-packet is additionally transmitted. And, if the acknowledgement is an affirmative (or positive) acknowledgement (hereinafter referred to as "ACK"), the transmission of the corresponding packet is ended.

In case N number of sub-packets is generated by using the HARQ method, when the transmitting end transmits an Mth sub-packet (M<N) and receives an ACK feedback, the transmitting end ends the transmission of the corresponding packet without transmitting the remaining sub-packets. This method is referred to as an early termination method. When using the early termination method, since unnecessary sub-packets are not transmitted, the packet transmission efficiency may foe largely enhanced.

Hereinafter, an early termination method of a related art circuit channel will now be described in detail.

A voice (or audio) service being sensitive to transmission delay and generating contiguous data is transmitted through a circuit channel. The circuit channel is a form of channel that performs data transmission without interruption.

FIG. 1 illustrates a method of controlling power of a reverse link in a CDMA 2000 system.

As shown in FIG. 1, in the code division multiple access (CDMA) 2000 system, which is currently being widely used, a frame of a traffic channel having the structure of a circuit channel generally corresponds to 20 ms. Each frame includes 16 slots, and each slot corresponds to 1.25 ms. Since the receiving end transmits one FOB for each slot, each slot is referred to as a power control group (PCG).

In order to enhance the transmission efficiency of the traffic channel having the circuit channel structure, the organization for the standardization of the 3rd Generation Partnership Project2 (3GPP2) is currently debating on whether or not to apply the early termination method in circuit channels.

Unlike the conventional method of having the receiving end receive a whole frame of 20 ms and then decoding the data, the early termination method in circuit channels attempts to decode data during the reception of the frame. Accordingly, if the data reception is successfully completed, the transmitting end sends an ACK feedback, thereby interrupting the transmission of the corresponding frame. Since this method interrupts (or discontinues) unnecessary transmission in the CDMA system, interference with other users can be reduced. Thus, the overall system capacity (or size) may be increased.

FIG. 2 illustrates an example of applying the early termination method in a reverse link traffic channel. Referring to FIG. 2, the base station attempts to decode data during the reception of a frame. Then, when data are successfully received, the base station transmits an ACK feedback to the mobile station through a forward acknowledge subchannel (F-ACKSCH). Then, once the ACK is received, the mobile station discontinues transmission of the corresponding frame.

In a soft handover, a mobile station receives traffic channels carrying identical information from two or more base stations. Then, the mobile station demodulates the traffic channels received from each of the two or more base stations and combines the demodulated traffic channels, thereby performing decoding.

In the CDMA system, the traffic channels transmitted by a single base station are differentiated (or identified) by a spread code. More specifically, the base station allocates different walsh codes to each of the traffic channels. Then, the base station modulates the signal by using the allocated walsh codes, thereby transmitting the modulated signal. At this point, in order to transmit a plurality of traffic channels without interference among one another in a single base station, the coding rate for the FEC channel coding in the traffic channel should be should be high. In the CDMA 2000 system, in case of radio configuration 4, the coding rate for the FEC channel coding in traffic channel of a forward link is ½.

When the coding rate is ½, when the early termination method is applied, decoding may be successful at the decoding attempt point only when at least half or more of a 20 ms frame has been received. In other words, the decoding success rate when less than half of a frame is received, is equal to 0.

Therefore, there lies a problem in that the gain of the early termination method cannot be enhanced.

SUMMARY OF THE INVENTION

As described above, the related art method is disadvantageous in that the early termination method cannot foe enhanced.

An object of the present invention devised to solve the problem lies on proposing a method of transmitting and receiving data in soft handoff that can enhance coding gain and early termination gain.

The technical objects that are to be realized and attained by the present invention are not limited only to the technical objects pointed out in the description set forth herein. Other technical objects that have not been pointed out herein will become apparent to those having ordinary skill in the art upon examination of the following or may be learned from the written description and claims hereof as well as the appended drawings.

In order to achieve the object of the present, invention, according to an aspect of the present invention, in a method of receiving data of a mobile station in soft handoff in a wireless communication system, the mobile station receives a first sequence from a first base station, wherein the first sequence is generated by interleaving transmission data using a first interleaver pattern, receives a second sequence from a second base station, wherein the second sequence is generated by interleaving the transmission data using a second interleaver pattern, and combines the first sequence end the second sequence and decodes the combined sequences, prior to receiving an entire frame having the first sequence allocated thereto.

In order to achieve the object of the present invention, according to another aspect of the present invention, a mobile station receiving data in soft handoff in a wireless communication system includes a receiving module receiving a first sequence from a first base station, the first sequence being generated by interleaving transmission data using a first interleaver pattern, and receiving a second sequence from a second base station, the second sequence being generated by interleaving the transmission data using a second interleaver pattern, and a decoder combining the first sequence and the second sequence and decoding the combined sequences, prior to receiving an entire frame having the first sequence allocated thereto.

At this point, the second sequence may correspond, to the first sequence being cyclically shifted by (length of the first sequence/2).

Also, the mobile station may transmit an ACK to the base station, when the decoding is successfully performed.

Moreover, the first sequence and the second sequence may be encoded as convolutional codes.

Furthermore, the transmission data may correspond to voice data.

In order to achieve the object of the present invention, according to another aspect of the present invention, in a method, of transmitting data from a first base station being in communication with a mobile station in soft handoff in a wireless communication system, the first base station transmits a first sequence to the mobile station, wherein the first sequence is generated by interleaving transmission data using a first interleaver pattern, and discontinues transmission of a frame having the first sequence allocated thereto, when a positive acknowledgement (ACK) is received from the mobile station. Herein, the first sequence is different from a second sequence being generated from a second base station by interleaving the transmission data using a second interleaver pattern, the second base station being in communication with the mobile station.

In order to achieve the object of the present invention, according to a further aspect of the present invention, in a base station being in communication with a mobile station in soft handoff in a wireless communication system, the base station includes an encoder encoding transmission data, and an interleaver generating a first sequence by interleaving the encoded data using a first inter leaver pattern. Herein, the first base station discontinues transmission of a frame having the first sequence allocated thereto, when a positive acknowledgement (ACK) is received from the mobile station, and the first sequence is different from a second sequence being generated from a second base station by interleaving the transmission data using a second interleaver pattern, the second base station being in communication with the mobile station.

At this point, the second sequence may correspond to the first sequence being cyclically shifted by (length of the first sequence/2).

Also, the mobile station may transmit an ACK to the base station, when the decoding is successfully performed.

Moreover, the first sequence and the second sequence may be encoded as convolutional codes.

Furthermore, the transmission data may correspond to voice data.

BRIEF DESCRIPTION OF THE DRAWINGS

FIG. 20(a) illustrates an encoder structure of a convolutional code having a generating polynomial of (561,753) and an encoder structure of a convolutional code having a generating polynomial of (557,751)

DETAILED DESCRIPTION OF TEE INVENTION

Figure 1:
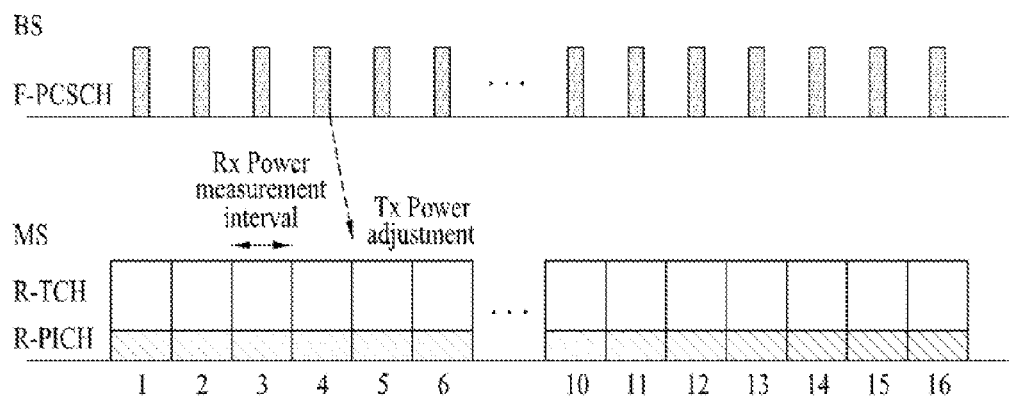
FIG. 1 illustrates a method of controlling power of a reverse link in a CDMA 2000 system.
Figure 2:
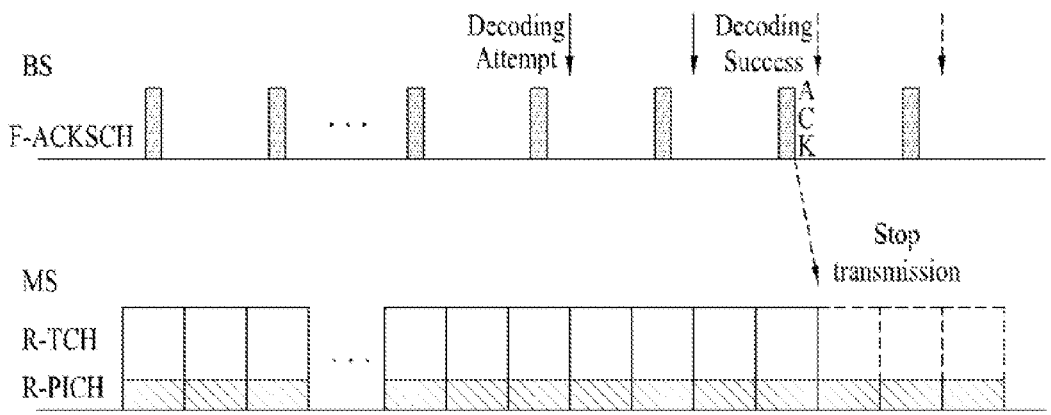
FIG. 2 illustrates an example of applying the early termination method in a reverse link traffic channel.

Reference will now be made in detail to the preferred embodiments of the present, invention, examples of which are illustrated in the accompanying drawings. The accompanying drawings, which are included to provide a further understanding of the invention, and which are incorporated in and constitute a part of this application, illustrate embodiments of the invention and together with the description serve to explain the principle of the invention. Wherever possible, the same reference numbers will be used throughout the drawings to refer to the same or like parts. And, parts irrelevant to the description of the present invention have been omitted.

Throughout the description of the present invention, when a part is said to "include" an element (or member part), unless specified differently, this does not signify that other elements are excluded but signifies that other elements may be further included. Also, each of the terms specified as "- - -unit", "-er (or -or)", "module", and so on indicates a unit processing at least one function or operation, and, may be realised in forms of hardware, or software, or a combination of hardware and software.

When the early termination method is applied to the circuit channels, the embodiments of the present invention describe methods that can enhance the gain from the early termination method.

Firstly, a method of transmitting a frame while changing (or varying) a traffic to pilot ratio (hereinafter referred to as "TPR") according to the embodiment of the present invention will now be described in detail.

TPR refers to a ratio between the power allocated to the traffic channel and the power allocated to the pilot channel. More specifically, in order to ensure the required performance of the traffic channel, the power allocated to the traffic channel is maintained or a constant ratio with respect to the power allocated to the pilot channel. Herein, TPR indicates the value of the power allocation ratio between the traffic channel and the pilot channel.

The TPR varies depending upon the transmission rate, coding method, and transmission frame period of the traffic channel. For example, in a CDMA 2000 system, when a voice signal (or audio signal) is transmitted through a reverse fundamental channel (R-FCH) at 9600 BPS, the TPR becomes 3.75 dB. More specifically, in comparison with the transmission power of the pilot channel, the transmission power of the traffic channel is 3.75 dB higher.

In the related art method, with the exemption of when the TPR is required to be changed due to a change in the channel environment, the TPR is maintained at a constant level. In case the TPR is required to be changed due to a change in the channel environment, the base station selects once again an adequate value and notifies the new TPR value to the mobile station. In other words, a fixed value is used within one frame.

The method of transmitting a frame according to the embodiment of the present invention transmits a traffic signal to each slot play applying TPR optimised for each slot within the frame depending upon channel and system conditions.

Figure 3:
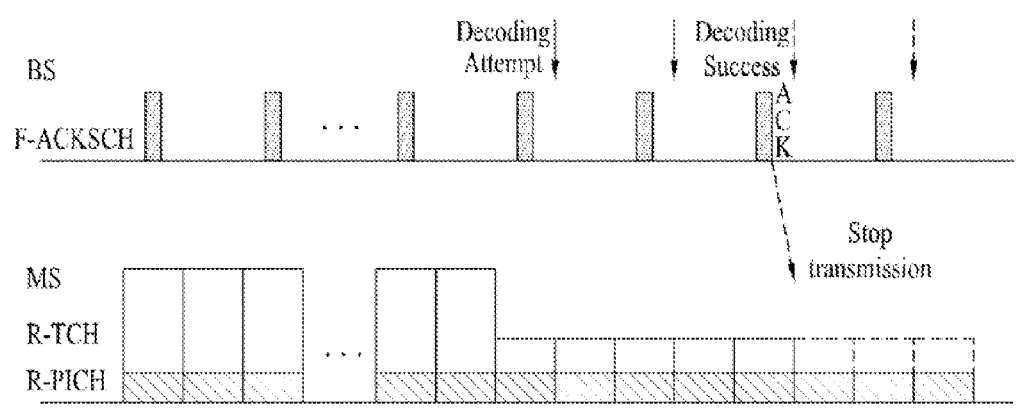
FIG. 3 illustrates an exemplary method of transmitting a frame while varying the TPR according to the embodiment of the present invention.

FIG. 3 illustrates an exemplary method of transmitting a frame while varying the TPR according to the embodiment of the present invention.

As shown in FIG. 3, the advantages of the early termination method may become effective when the front portion of a frame transmits a traffic channel at a high TPR, and when the end portion of the frame transmits a traffic channel at a low TPR. In case the early termination method is applied to the circuit channel, signals of at least 2 or more slots are unnecessarily transmitted starting from the point where the receiving end has succeeded in decoding data to the point where the transmitting end has discontinued signal transmission of the corresponding frame. Therefore, by setting the end portion of the frame, wherein the probability of the ACK feedback becomes greater, to have a low TPR, the power amount of the signals being unnecessarily transmitted may be reduced, thereby reducing the level (or amount) of interference of the entire system.

In the method of transmitting a frame by varying the TPR according to the embodiment of the present invention, the base station may change the TPR by using a variety of methods.

Firstly, according to a step reduction TPR method, a TPR within a single frame has two different values, wherein the 1st slot, to the Nth slot use the higher TPR value, and wherein the N+1th slot to the last slot use the lower TPR value.

According to the related art method, when the transmission data rate is 9600 BPS, all 16 slots within a general channel environment use a TPR of 3.75 dB. herein, according to the step reduction TPR method, the first 8 slots may use a TPR of 5.5 dB, which corresponds to a TPR 1.5 times (1.75 dB) greater than the conventional TPR, and the remaining 8 slots may use a TPR of 0.75 dB, which corresponds to a TPR 50% lower than the conventional TPR.

Subsequently, according to a multi-step reduction TPR method, the TPR within a single frame has three different values, wherein the slots of the one frame are divided into multiple regions, and wherein the slots belonging to the first region use the highest TPR value, and wherein the slots belonging to the next regions respectively use TPR values sequentially lower than the first (or highest) TPR.

Figure 4:
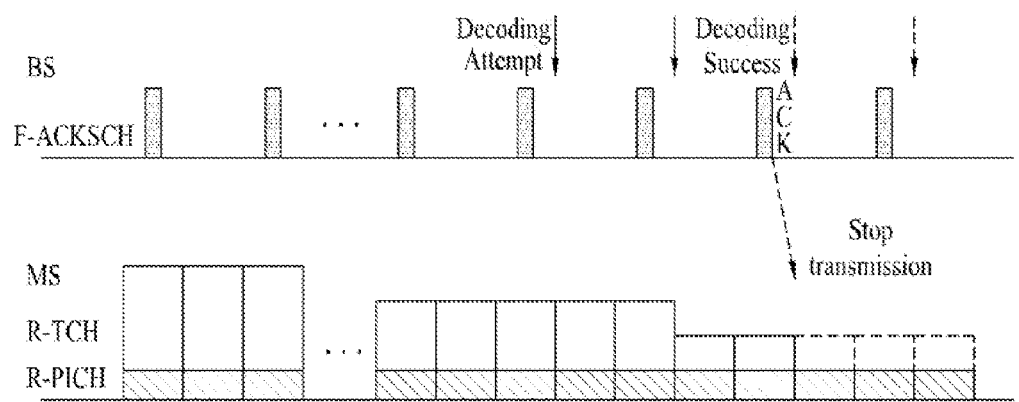
FIG. 4 illustrates a 2-step reduction TPR method according to an embodiment of the present invention.

FIG. 4 illustrates a 2-step reduction TPR method according to an embodiment of the present invention.

Referring to FIG. 4, according to the 2-step reduction TPR method, the TPR within a single frame has three different values, wherein the slots of the one frame are divided into 3 different regions. Herein, the slots belonging to the first region use the highest TPR value, the slots belonging to the second region use the second highest TPR value, and the slots belonging to the third region use the lowest TPR value.

Subsequently, according to a multi-step varying TPR method, the TPR within a single frame has multiple values, wherein the slots of the one frame are divided into multiple regions, and wherein the slots belonging to the first region use the first TPR value, and wherein the slots belonging to the next regions respectively use the next TPR values.

Figure 5:
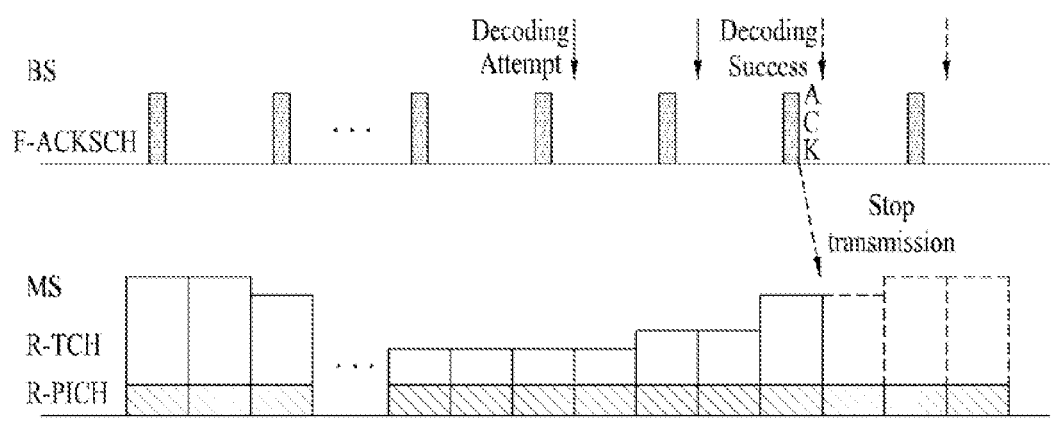
FIG. 5 illustrates an exemplary multi-step varying TPR method according to an embodiment of the present invention.

FIG. 5 illustrates an exemplary multi-step varying TPR method according to an embodiment of the present invention.

Referring to FIG. 5, the slots in one frame are divided into 8 regions, and each region includes 2 PCGs. The slots in each region use TPR values suitable for each group, respectively. In FIG. 5, a higher TPR value is used at the beginning of the frame, and with respect to the increase in the PCG index, lower TPR values are used. Then, the TPR values become higher once again at near the end of the frame. This is to increase early termination probability by using higher TPR values at the beginning of the frame and, also, to increase frame reception success rate by once again using higher TPR values at the end of the frame. The multi-step varying TPR method may be extended to a method of allocating independent TPRs to all PCGs.

The base station and mobile station are aware of the pre-decided default TPR value and uses this default value. However, in case the TPR value is required to be changed in accordance with the channel environment (or condition) or the mobile station, the base station uses an upper signaling to notify such requirement to the mobile station. However, according to the multi-step varying TPR method, since the TPR value is defined for each region, if the TPR value for each region is to be notified to the mobile station through upper signaling, the signaling overhead will become too large. Therefore, the embodiment of the present invention proposes a method, wherein the mobile station and the base station is aware of the pre-decided TPR boost value set, and wherein base station notifies the corrected TPRMOD value and the TPR boost value set index.

Table 1 shows examples of TPR boost value sets according to the embodiment of the present invention.

TABLE 1

| TPR boost value set index | TPR_boost | | | | | | | |
|---|---|---|---|---|---|---|---|---|
| | PCG 0, 1 | PCG 2, 3 | PCG 4, 5 | PCG 6, 7 | PCG 8, 9 | PCG 10, 11 | PCG 12, 13 | PCG 14, 15 |
| 0 | 1 | 1 | 1 | 1 | 1 | 1 | 1 | 1 |
| 1 | 1.5 | 1.5 | 1.5 | 1.5 | 0.5 | 0.5 | 0.5 | 0.5 |
| 2 | 1.5 | 1.5 | 0.5 | 0.5 | 0.5 | 0.5 | 1.5 | 1.5 |
| 3 | 1.5 | 1.25 | 0.75 | 0.5 | 0.5 | 0.75 | 1.25 | 1.5 |

As shown in Table 1, in case the TPR boost value set between the mobile station and the base station is decided, when the base station notifies the corrected TPRMOD value and TPR boost value set index, the mobile station may calculate the TPR(i) of the i-th PCG by using Equation 1 below.

$$TPR(i)=TPR\_boost(i)*TPRMOD \quad \text{[Equation 1]}$$

Herein, TPR_boost (i) represents the TPR_boost value of the i-th PCG shown in Table 1.

Subsequently, a method of transmitting a frame by varying a ratio between the transmission power of a forward control subchannel and the transmission power of a forward traffic channel (or F-TCH to F-PCSCH ratio, hereinafter referred to as a "F-TCH/F-PCSCH power ratio") in a forward link according to the embodiment of the present invention will now be described in detail.

Since the pilot channel of a forward link is a common channel, the pilot channel cannot be the subject of power control. Therefore, the power control of the forward link should be performed by directly controlling power of the receiving power of the forward traffic channel (hereinafter referred to as "F-TCH"). Herein, when the forward traffic channel provides a variable data rate service such as a voice (or audio) service, due to an uncertainty in the transmission rate, the receiving end cannot directly measure the receiving power of the traffic channel.

Figure 6:
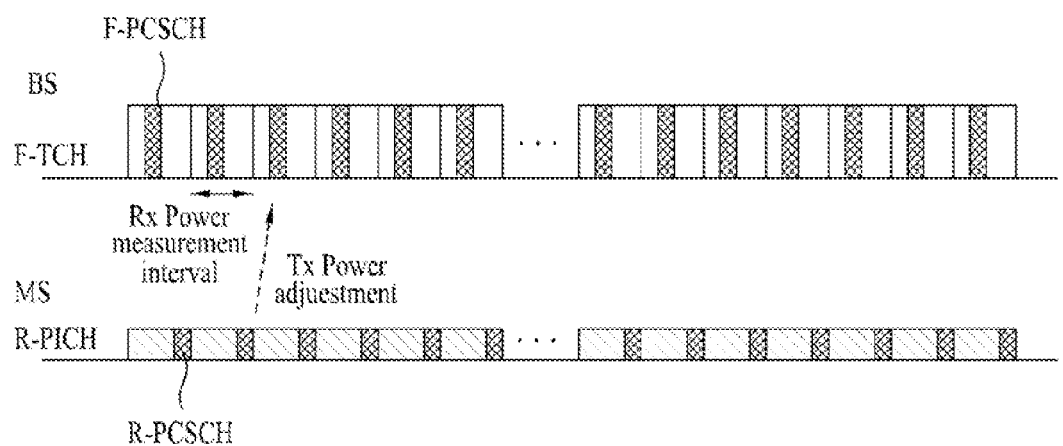
FIG. 6 illustrates a method of controlling power in a forward link.

FIG. 6 illustrates a method of controlling power in a forward link.

As shown in FIG. 6, the base station transmits a forward, power control subchannel, (hereinafter referred to as "F-PC-SCH"), which is a PCB feedback channel for controlling a reverse transmission power, to the mobile station through a forward link along with the traffic channel. Since the F-PC-SCH has a fixed data rate, the F-PCSCH may be directly used for measuring the receiving power. The transmission power of the F-TCH is defined by the F-TCH/F-PCSCH power ratio, and, according to the related art method, the F-TCH/F-PC-SCH power ratio is maintained within one frame. The mobile station measures the receiving power of the F-PCSCH, so as to use the pre-known F-TCH/F-PCSCH power ratio, thereby calculating an energy to noise (Eb/No) density per receiving bit, when the data transmission rate of the F-TCH is 9600 bps. Thereafter, the mobile station compares the Eb/No with the setpoint, so as to generate a power control bit (hereinafter referred to as "PCS"), thereby transmitting the generated PCB to the base station through a reverse power control subchannel (hereinafter referred to as "R-PCSCH") and controlling the transmission power of the F-TCH and the F-PC-SCH.

Figure 7:
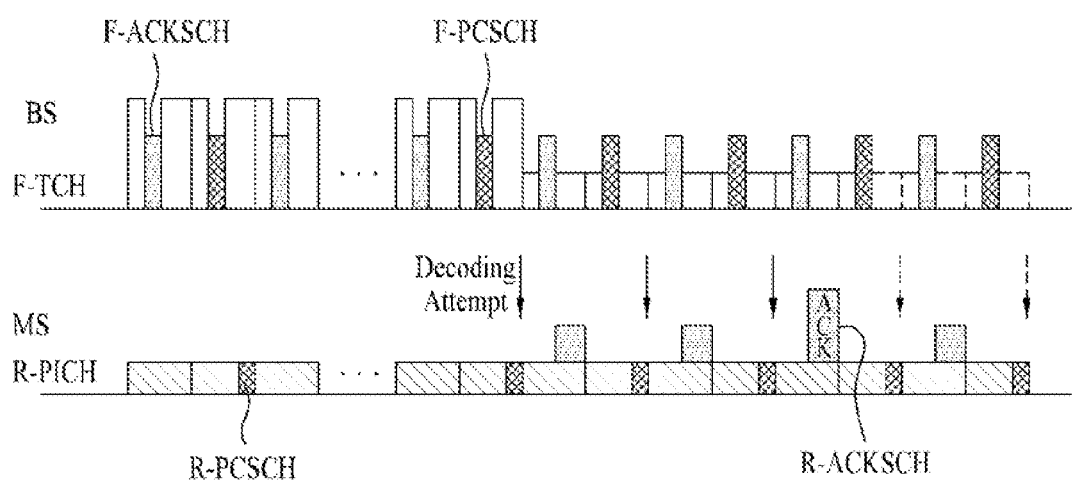
FIG. 7 illustrates a method of controlling power in a forward link according to an embodiment of the present invention.

FIG. 7 illustrates a method of controlling power in a forward link according to an embodiment of the present invention.

According to an embodiment of the present invention, the F-TCH/F-PCSCH power ratio is varied within one frame. For example, as shown in FIG. 1, when the data rate is 9600 BPS, and when the reference value is 0 dB, a 1-step reduction method is applied, so that the first 8 slots can use a F-TCK/F-PCSCH power ratio of 1.75 dB, which corresponds to a F-TCH/F-PCSCH power ratio 1.5 times greater than the reference ratio, and so that the remaining S slots can use a F-TCH/F-PCSCH power ratio of −3 dB, which corresponds to a F-TCH/F-PCSCH power ratio 50% lower than the reference ratio, thereby performing transmission.

Accordingly, the mobile station measures a receiving power of the F-PCSCH and compares the receiving Eb/No of the FL-PCB with the setpoint, so as to generate a reverse link PCB (RL-PCB) and transmit the generated RL-PCB to the base station, thereby performing forward link power control.

Also, the base station divides the slots within one frame into multiple regions and may notify the mobile station in advance of the F-TCH/F-PCSCH power ratio for each region. Accordingly, the mobile station may measure the receiving power of the F-PCSCH in each region, so as to use the pre-known F-TCH/F-PCSCH power ratio of the corresponding region, thereby calculating an energy to noise (Eb/Po) density per receiving bit, when the data transmission rate of the F-TCH is 9600 bps. Thereafter, the mobile station may compare the Eb/No with the setpoint, so as to generate a PCB.

Subsequently, a method of controlling an outer power control loop according to an embodiment of the present invention will now be described in detail.

Generally, power control is performed through an inner power control loop and an outer power control loop.

The inner power control loop measures the energy of the receiving signal in the receiving end. Then, when the energy of the receiving signal is greater than the pre-decided setpoint, a down power control command is transmitted to the transmitting end. And, when the energy of the receiving signal is lower than the pre-decided setpoint, an up power control command is transmitted to the transmitting end. Thus, power control is performed. The outer power control corresponds to controlling a setpoint, which is used in the inner power control loop so that a target frame error rate target FER can be satisfied.

According to a general method of controlling an outer power control loop, in case the target FER is F, the receiving end increases the setpoint by x dB, when a frame error occurs. Then, when the frame is successfully decoded, the receiving end reduces the setpoint by x/(1−1/F) dB. For example, in case the target FER is 1%, the receiving end increases the setpoint by 1 dB, when a frame error occurs. Then, when the frame is successfully decoded, the receiving end reduces the setpoint by 1/(1−1/0.01) dB=1/99 dB.

At this point, if the x value of x dB, which corresponds to the increased amount of the setpoint, is set to have a high value, and when the setpoint required by a change in the channel environment is varied, it is advantageous in that the receiving mobile station can swiftly vary the setpoint. However, in a channel environment that does not undergo changes and having a stable setpoint, the used setpoint may become unstable (or may jitter) around the required setpoint, thereby causing a critical problem. Furthermore, a setpoint that is used when frame errors occur consecutively due to instant burst noise is set to be greater than the required setpoint. Therefore, it may take a long period of time for the used setpoint to regress back to required setpoint.

Therefore, in order to resolve such problems, when the early termination method is applied to the circuit channel, the embodiment of the present invention proposes a method of controlling the outer power control loop.

First of all, a method of controlling an outer power control loop according to a first embodiment of the present invention will be described in detail with reference to FIG. 8 and FIG. 9.

According to the early termination method, the receiving end attempts to perform decoding in a condition wherein a portion of the frame has been received. In the embodiment of the present invention, among the many point of attempt for performing decoding, at least one or more points of target decoding attempt is/are set, thereby deciding a target FER of the target decoding attempt point, so that the set points of target decoding attempt satisfy the target FER at the point where the entire frame has been received. Subsequently, the setpoint of the inner power control loop is controlled so that the target FEE at the decided point of attempt for target decoding can be satisfied.

For example, when the target FER at the point where the entire frame has been received corresponds to 1%, the target FER at the point of attempt for target decoding may be set to 20~50%. Also, the setpoint of the inner power control loop may be controlled so that the target FER at the point of attempt for target decoding can be satisfied.

Figure 8:
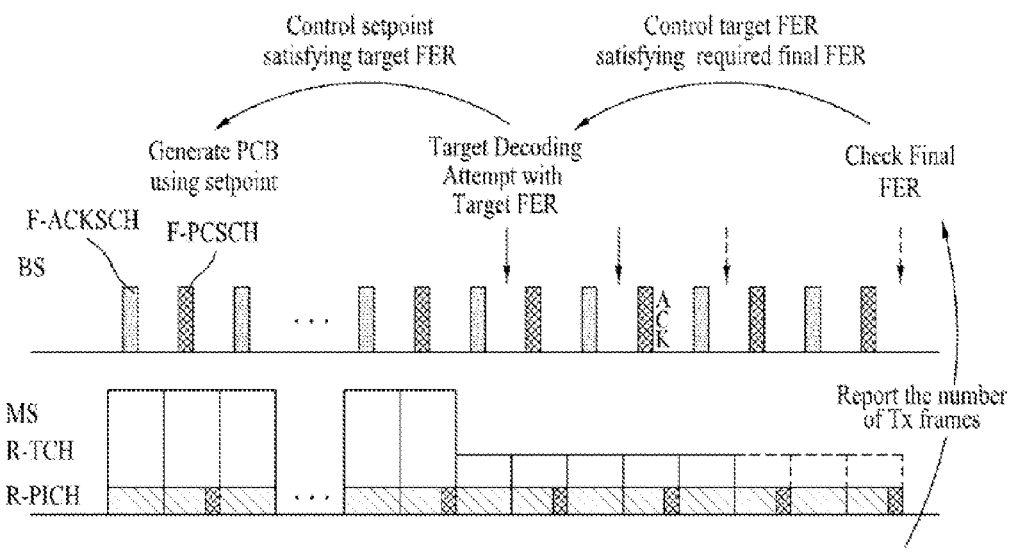
FIG. 8 illustrates a method for controlling an outer power control loop in a reverse link according to a first embodiment of the present invention.
Figure 9:
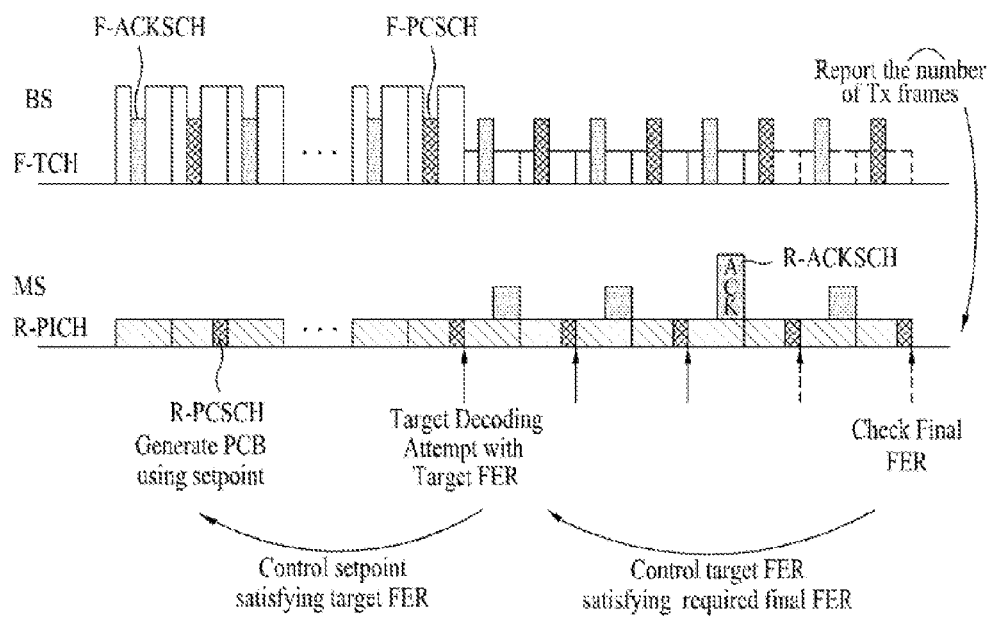
FIG. 9 illustrates a method for controlling an outer power control loop in a forward link according to a first embodiment of the present invention.

FIG. 8 illustrates a method for controlling an outer power control loop in a reverse link according to a first embodiment of the present invention, and FIG. 9 illustrates a method for controlling an outer power control loop in a forward link according to a first embodiment of the present invention.

Referring to FIG. 8, the base station controls the target FER of the target decoding attempt poi nu so that a final FER, which corresponds to the target FER of the point where the entire frame has been received, can be satisfied. Also, the base station controls the setpoint, so that the target FER of the target, decoding attempt point can be satisfied. Furthermore, when the base station receives a signal from the mobile station, the base station compares the energy of the received signal with the set point, so as to generate a power control command, thereby transmitting the generated command to the mobile station.

Referring to FIG. 9, the mobile station controls the target FER of the target decoding attempt point so that a final FER, which corresponds to the target FER of the point where the entire frame has been received, can be satisfied. Also, the mobile station controls the setpoint, so that the target FER of the target decoding attempt point can be satisfied. Furthermore, when the mobile station receives a signal from the base station, the mobile station compares the energy of the received signal with the set point, so as to generate a power control command, thereby transmitting the generated command to the base station.

Subsequently, a method of controlling an outer power control loop according to a second embodiment of the present invention will be described in detail with reference to FIG. 10 and FIG. 11.

According to the second embodiment of the present invention, when the receiving end transmits a target FER of a point receiving the entire frame to the transmitting end, the transmitting end sets the target FER of a target decoding attempt point so that the target FER of the point receiving the entire frame can be satisfied. Then, when the transmitting end transmits the set target FER to the receiving end, the receiving end controls the setpoint of the inner power control loop so that the received target FER can be satisfied.

When the data rate is variable, such as audio (or voice) data, a zero data rate exists. More specifically, in some cases data are substantially not transmitted to the frame, when decoding of the frame is failed, if is difficult for the receiving end to identify whether the decoding of the frame has failed due to a channel error or whether the decoding of the frame has failed because there are no transmission data. Therefore, in the second embodiment of the present invention, if the receiving end notifies the number of successfully decoded frames during a set period of time to the transmitting end, the transmitting end sets the target FER of a target decoding attempt point so that the target FER of the point receiving the entire frame can be satisfied, while taking into consideration a length of measured for time for the number of successfully decoded frames, the number of successfully decoded frames, and the number of frame having no data transmission, thereby notifying the receiving end end of the set target FER.

Figure 10:
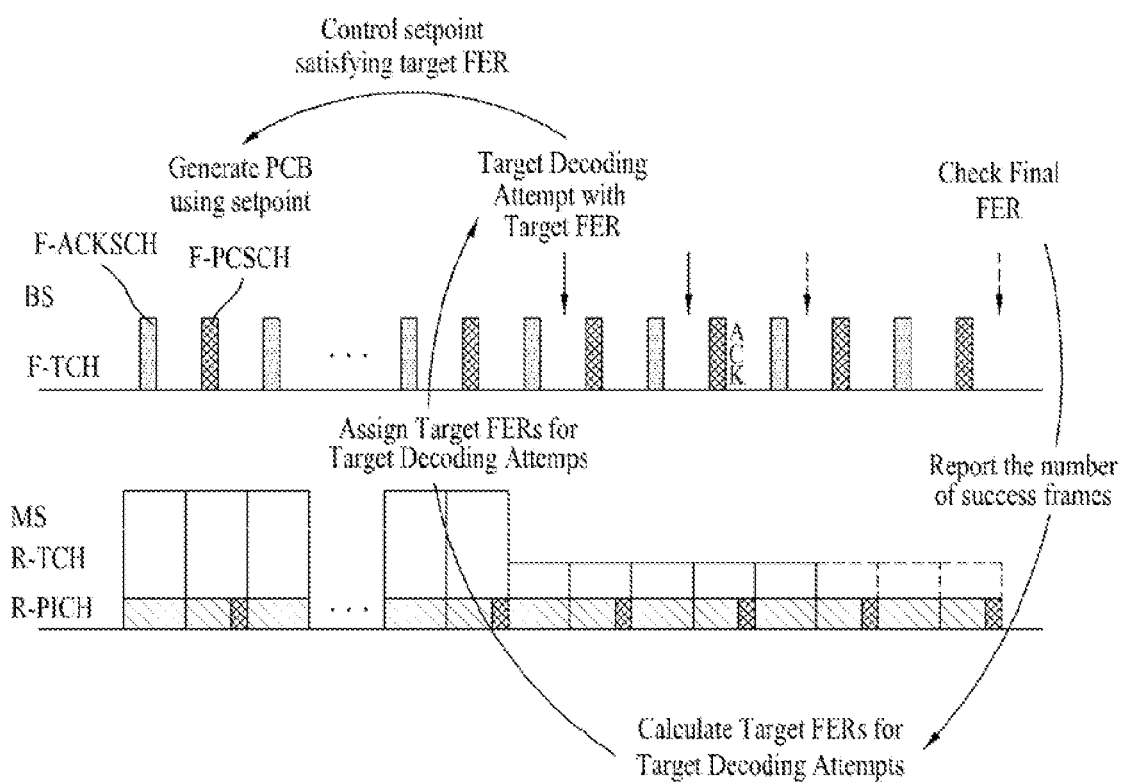
FIG. 10 illustrates a method for controlling an outer power control loop in a reverse link according to a second embodiment of the present invention.
Figure 11:
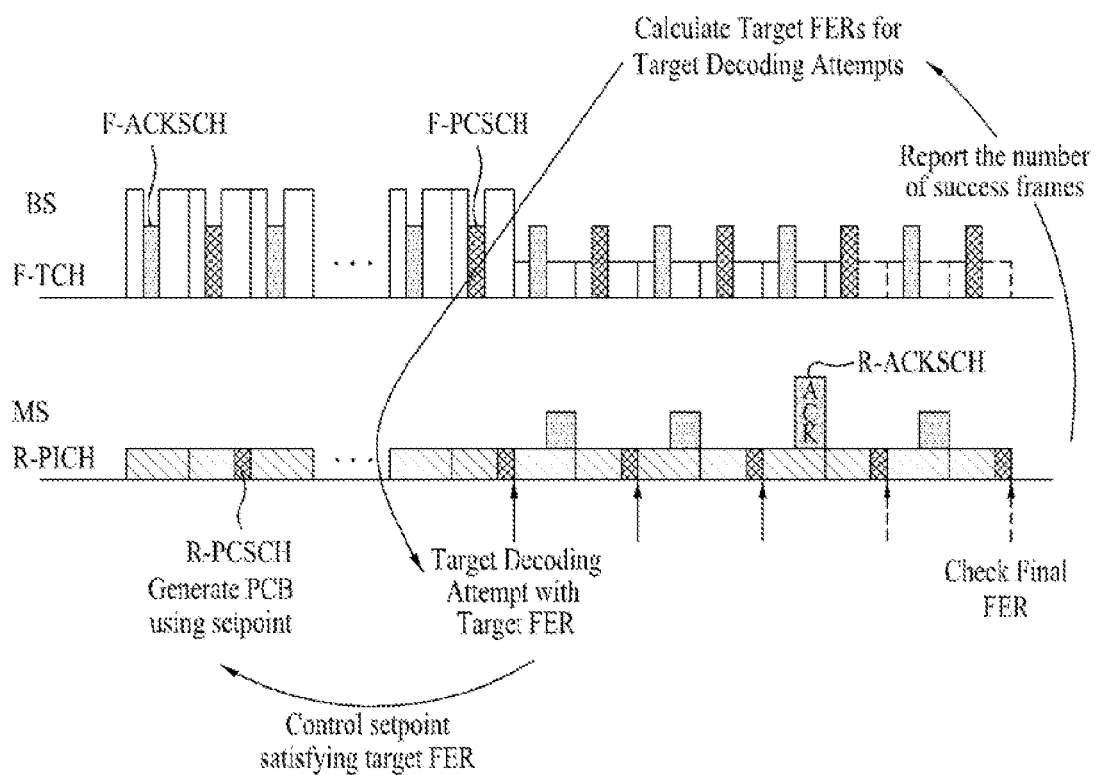
FIG. 11 illustrates a method for controlling an outer power control loop in a forward link according to a second embodiment of the present invention.

FIG. 10 illustrates a method for controlling an outer power control loop in a reverse link according to a second embodiment of the present invention, and FIG. 11 illustrates a method for controlling an outer power control loop in a forward link according to a second embodiment of the present invention.

Referring to FIG. 10, the base station transmits a final FER, which corresponds to the target FER of the point where the entire frame has been received, and a number of successfully decoded frames for s set period of time. Accordingly, the mobile station sets the target FER of a target decoding attempt point so that the target FER of the point receiving the entire frame can be satisfied, while taking into consideration a length of measured for time for the number of successfully decoded frames, the number of successfully decoded frames, and the number of frame having no data transmission, thereby notifying the base station of the set target FER. Also, the base station controls the setpoint of the inner power control loop, so that the received target FER can be satisfied. Furthermore, when the base station receives a signal from the mobile station, the base station compares the energy of the received signal with the set point, so as to generate a power control command, thereby transmitting the generated command to the mobile station.

Referring to FIG. 11, the mobile station transmits a final FER, which corresponds to the target FER of the point where the entire frame has been received, and a number of successfully decoded frames for a set period of time. Accordingly, the base station sets the target FER of a target decoding attempt point so that the target FER of the point receiving the entire frame can be satisfied, while taking into consideration a length of measured for time for the number of successfully decoded frames, the number of successfully decoded frames, and the number of frame having no data transmission, thereby notifying the mobile station of the set target FER. Also, the mobile station controls the setpoint of the inner power control loop, so that the received target FER can be satisfied. Furthermore, when the mobile station receives a signal from the base station, the mobile station compares the energy of the received signal with the setpoint, so as to generate a power control command, thereby transmitting the generated command to the base station.

Hereinafter, a method of controlling an outer power control loop according to a third embodiment of the present invention will be described in detail with reference to FIG. 12 and FIG. 13.

According to the third embodiment of the present invention, when the receiving end transmits a target FER of the point receiving the entire frame to the transmitting end, the transmitting end compensates the transmitting signal so that the target FER of the point receiving the entire frame can be satisfied.

Figure 12:
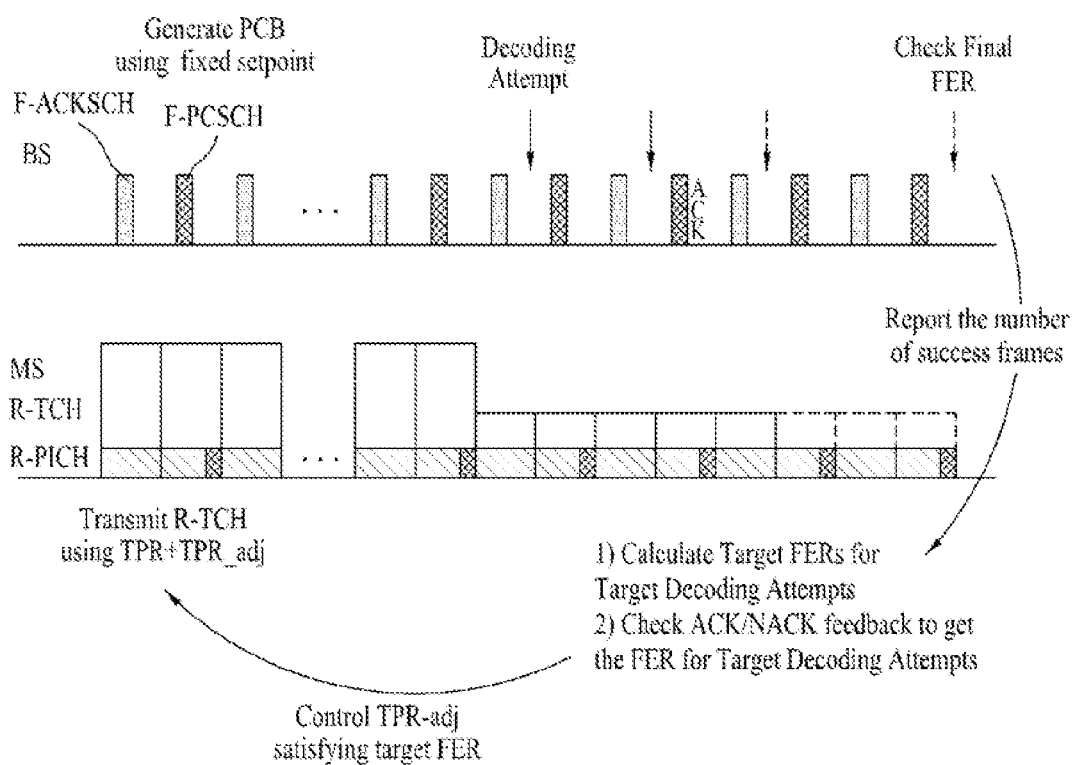
FIG. 12 illustrates a method for controlling an outer power control loop in a reverse link according to a third embodiment of the present invention.
Figure 13:
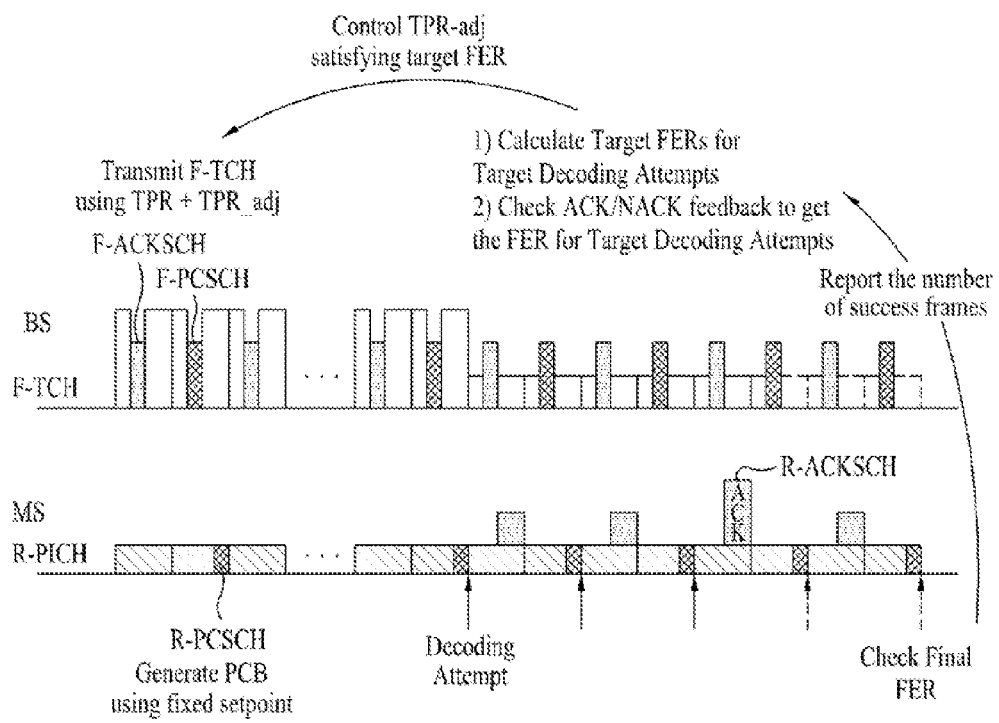
FIG. 13 illustrates a method for controlling an outer power control loop in a forward link according to a third embodiment of the present invention.

FIG. 12 illustrates a method for controlling an outer power control loop in a reverse link according to a third embodiment of the present invention, and FIG. 13 illustrates a method for controlling an outer power control loop in a forward link according to a third embodiment of the present invention.

Referring to FIG. 12, the base station transmits the target FER of the point receiving the entire frame to the mobile station. Accordingly, the mobile station calculates the target FER of the target decoding attempt point so that the target FER of the point receiving the entire frame can be satisfied. Then, the mobile station calculates the FER of the target decoding attempt point by using the ACK/NACK received from the base station. Furthermore, the mobile station compares the FER of the target decoding attempt point calculated by using the ACK/NACK with the target FER, thereby compensating the TPR of the transmitting signal.

At this point, the base station uses a pre-defined value of the setpoint of the inner power control loop.

Referring to FIG. 13, the mobile station transmits the target FER of the point receiving the entire frame to the base station. Accordingly, the base station calculates the target FER of the target decoding attempt point so that the target FER of the point receiving the entire frame can be satisfied. Then, the base station calculates the FER of the target decoding attempt point by using the ACK/NACK received from the mobile station. Furthermore, the mobile station compares the FER of the target decoding attempt point calculated by using the ACK/NACK with the target FER, thereby compensating the TPR of the transmitting signal. Herein, the TPR signifies the F-TCH/F-PCSCH power ratio.

At this point, the mobile station uses a pre-defined value of the setpoint of the inner power control loop.

Subsequently, a method for transmitting acknowledgement/negative acknowledgement (hereinafter referred to as "ACK/NACK") according to an embodiment of the present invention will now be described in detail.

In applying the early termination method to the circuit channel, the performance of the acknowledgement channel (hereinafter referred to as "ACKCH") is important. Acknowledgement errors include an ACK2NACK error, wherein ACK is recognized as NACK, and an NACK2ACK error, wherein HACK is recognised as ACK. When the ACK2NACK error occurs, the transmitting end cannot perform early termination on the transmission of the corresponding frame, and, therefore, the gain of the early termination cannot be obtained. When the NACK2ACK error occurs, even if the corresponding frame has failed to be successfully decoded by the receiving end, the transmitting end performs early termination on the transmission of the corresponding frame, thereby increasing the FER.

Therefore, in order to resolve the above-described problem, according to the embodiment of the present invention, the mobile station repeatedly transmits ACK/NACK until the corresponding frame is completed.

Figure 14:
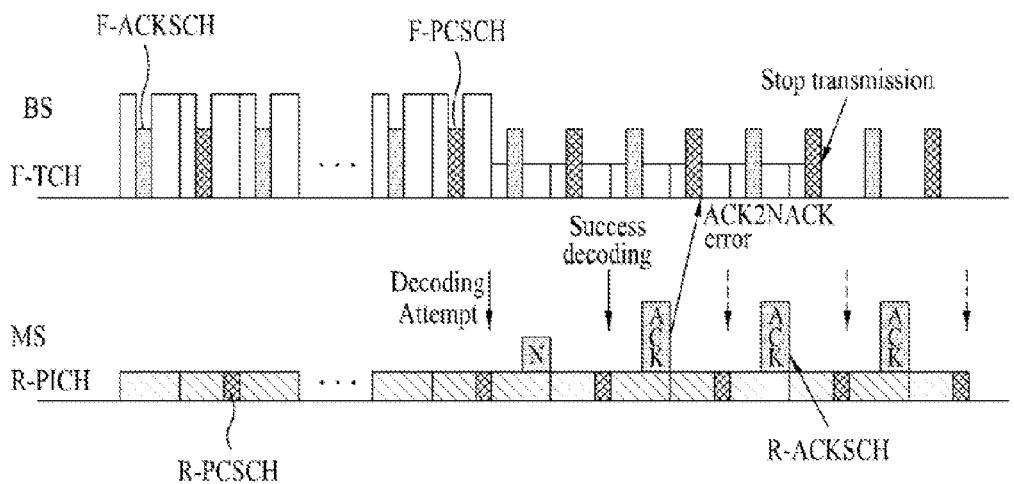
FIG. 14 illustrates an example of repeatedly transmitting ACK according to an embodiment of the present invention.

FIG. 14 illustrates an example of repeatedly transmitting ACK according to an embodiment of the present invention. And, FIG. 15 illustrates an example of repeatedly transmitting NACK according to an embodiment of the present invention.

Figure 15:
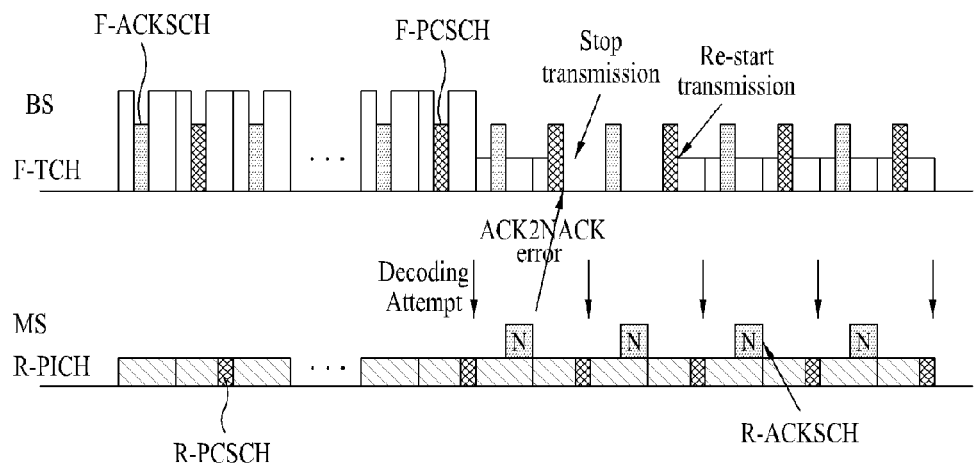
FIG. 15 illustrates an example of repeatedly transmitting NACK according to an embodiment of the present invention.

FIG. 14 and FIG. 15 respectively illustrate ACK/NACK transmission in a forward link traffic. However, the present invention may also be applied to ACK/NACK transmission in a reverse link traffic.

As shown in FIG. 14, when the mobile station performs decoding at a decoding attempt point and succeeds in the decoding process, the mobile station continuously transmits the ACK signal to the base station until the corresponding frame is completed. Therefore, even when an ACK2NACK error has occurred, if the base station receives the next transmitted ACK signal without any error, the transmission of the frame may be terminated early.

As shown in FIG. 15, when an NACK2ACK error has occurred, the base station receives the ACK and discontinues the transmission of the frame. Then, when the next transmitted NACK signal is received without any error, the base station continues the frame transmission.

Hereinafter, a method for designating the data rate according to an embodiment of the present invention will now be described in detail.

When the early termination method is applied to the circuit channel, the receiving end performs decoding at each decoding attempt point. Therefore, the complexity of the receiver increases as compared to when attempting to perform decoding only once at the end of the frame. Particularly, in case the data rate of the traffic channel corresponds to a variable rate, a blind rate decoding should be performed by assuming all rates within the variable rate set at all decoding attempt points.

In order to enhance the effect of the early termination method, since decoding should be completed within a short period of time, and since an ACK feedback should be sent to the transmitting end so as to stop (or discontinue) any further unnecessary transmission, the receiver should quickly perform decoding. However, in order to perform decoding within a short period of time by assuming all rates within the variable rate set, the complexity of the receiver will eventually foe increased.

Therefore, the embodiment of the present Invention proposes a method of designating a data rate or data rate subset of the frame to the receiving end.

Figure 16A:
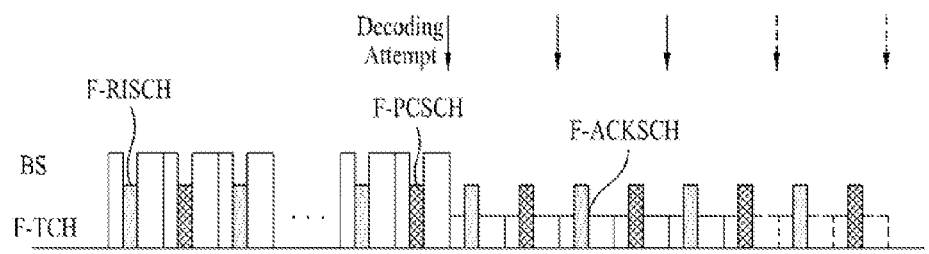
FIG. 16(a) illustrates a method of designating a data rate in a forward link according to an embodiment of the present invention.
Figure 16B:
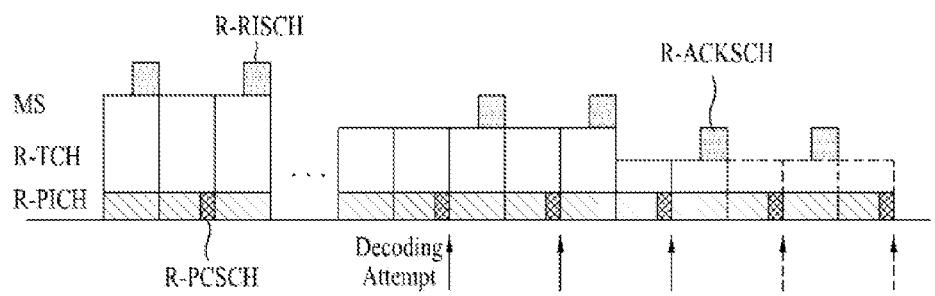
FIG. 16(b) illustrates a method of designating a data rate in a reverse link according to an embodiment of the present invention.

FIG. 16(a) illustrates a method of designating a data rate in a forward link according to an embodiment of the present invention, and FIG. 16(b) illustrates a method of designating a data rate in a reverse link according to an embodiment of the present invention.

It is highly unlikely for the ACKSCH to be used at the beginning of the frame. Therefore, as shown in FIGS. 16(a) and (b), at the beginning of the frame, a source of the ACKSCH may be used for designating the data rate. More specifically, the source of the ACKSCH may be used as a rate indication subchannel (hereinafter referred to as "RISCH") at the beginning of the frame. According to the embodiment of the present invention, an identical wireless source or an identical CDMA code source is used as the RISCH at the beginning of the frame, and the same source is used as the ACKSCH at the end of the frame.

When transmitting data of a voice (or audio) signal, for example, in a CDMA 2000 system, the data rates of the traffic channel may consist of 5 variable data rates: 9600 bps, 4800 bps, 2400 bps, 1200 bps, and 0 bps. In this case, the data rate may be indicated as shown in Table 2. Table 2 shows an example of modulation symbols being transmitted through an RISCH for each data rate. More specifically, the transmitting end transmits a symbol corresponding to the data rate shown in Table 2 to the receiving end, so that the receiving system can notify the data rate of the frame.

TABLE 2

| Data rate | Modulation symbol on RISCH |
|---|---|
| 9600 bps | 1 |
| 4800 bps | −1 |
| 2400 bps | J |
| 1200 bps | −j |
| 0 bps | 0 |

Also, the transmitting end may modulate the RISCH as shown in Table 3 or Table 4. Table 3 shows another example of modulation symbols being transmitted through an RISCH for each data rate. And, Table 4 shows yet another example of modulation symbols being transmitted through an RISCH for each data rate.

TABLE 3

| Data rate | Modulation symbol on RISCH |
|---|---|
| 9600 bps | 1 |
| 4800 bps or 2400 bps or 1200 bps | −1 |
| 0 bps | 0 |

TABLE 4

| Data rate | Modulation symbol on RISCH |
|---|---|
| 4800 bps | 1 |
| 2400 bps or 1200 bps | −1 |
| 0 bps or 9600 bps | 0 |

As shown in Table 3 or Table 4, when multiple data rates are modulated into the same symbol, even when an error occurs in the RISCH during the transmission process, the probability of the signal being correctly modulated in the receiving end is high. Since the receiver can decode the highest data rate, the receiver may simultaneously perform blind rate decoding on multiple low data rates.

In case of a voice service, Table 4 allocates a modulation symbol 0 to 9600 bps and 0 bps, which have the highest occurrence frequency level, thereby having the advantage of reducing the overhead of the RISCH transmission power.

When the transmitting end transmits a modulation symbol to the receiving end, as shown in Tables 1 to 3, through the RISCH, the receiving end assumes the data rate corresponding to the modulation symbol, thereby decoding the decoding attempt point. Also, when decoding is not successfully performed at the decoding attempt point, the receiving end performs blind rate decoding on all data rate sets after receiving the entire frame.

In the case where an error occurs in the RISCH, since the RISCH is transmitted at the beginning of the frame, the beginning of the frame is faded. However, in case the beginning of the frame is faded, the probability of an early termination of the frame decreases, Therefore, there is hardly any deterioration in the performance of the traffic channel caused by an error in the RISCH.

Hereinafter, an emergency power control method using a negative RACK according to an embodiment of the present invention will now be described in detail.

When the early termination method is applied to the circuit channel, the ACKSCH transmits a modulation symbol 1 as the ACK and a modulation symbol 0 as the HACK, so as to reduce the overhead of the transmission power. More specifically, in case of the NACK, since the power of the signal being transmit tea to the ACKSCH is 0, the overhead of the transmission power of the ACKSCH may be reduced, The embodiment of the present invention proposes a method for transmitting a negative NACK. According to the embodiment of the present invention, a modulation symbol 1. is transmitted as the ACK, a modulation symbol 0 is transmitted as the NACK, and a modulation symbol −1 is transmitted as the negative NACK.

The negative NACK may be used for performing an emergency power control.

For example, the receiving end measures the receiving energy of the traffic channel at a decoding attempt point. Then, when the receiving end determines that the receiving energy of the frame does not satisfy the energy required for successfully receiving a frame at the ending point of a frame, the receiving end transmits a negative NACK to the transmitting end, so that the transmitting end can increase the transmission power of the traffic channel.

In another example, when the energy of the signal received by the receiving end is lower than the power control setpoint by a pre-decided level or more, the receiving end transmits a negative NACK to the transmitting end, and the transmitting end receiving the negative NACK increases the transmission power by PC_UP_SIZE+BOOST_UP [dB].

More specifically, when the receiving energy (Rx_Pwr) of a power control reference channel is lower than the power control setpoint by a pre-decided level (Boost_Th) or more (Rx_Pwr<(setpoint−Boost_Th)), the receiving end transmits a negative NACK to the transmitting end. At this point, since the receiving energy becomes lower than the setpoint (Rx_Pwr<setpoint) during a general power control process, an up power control command is transmitted to the transmitting end. Generally, when the transmitting end receives an up power control command, the transmission power is increased by PC_UP_SIZE. Alternatively, when the transmitting end receives both the up power control command and the negative NACK, the transmission power is increased by PC_UP_SIZE+BOOST_UP [dB].

Furthermore, in case the ACK/NACK feedback channel is more reliable than the PCB feedback channel, when the transmitting end receives a negative NACK, the transmitting end disregards the received power control command and may increase the transmission power by PC_UP_SIZE+BOOST_UP [dB].

Also, in case the mobile station received a power control command from two base stations, in a handover condition (or situation), thereby performing power control of a reverse link channel, according to an embodiment of the present invention, when the mobile station receives a negative NACK from both base stations within a specific time window, the mobile station may increase the transmission power by PC_UP_SIZE+BOOST_UP [dB].

Hereinafter, a method of transmitting and receiving data in soft handoff according to an embodiment of the present invention will now be described in detail.

In the related art method, in a soft handoff, the mobile station receives identical information from multiple base stations. Therefore, the mobile station cannot make the most of the advantages of early termination. Therefore, this embodiment of the present invention proposes a method for transmitting and receiving data that can enhance the gain of early termination in a handoff environment by having multiple base stations, which are in communication with the mobile station, transmit data each using a different pattern or code.

The process of obtaining a high coding gain, by having multiple base stations being in communication with the mobile station of a soft handoff environment transmit data each using a different pattern or code, and by having the mobile station combine each of the different patterns or codes, is referred to as a code combining (or union) soft handoff.

First of all, the method of transmitting and receiving data in a soft handoff according to a first embodiment of the present invention will now be described in detail.

According to the first embodiment, when multiple base stations being in communication with a mobile station in soft handoff respectively transmit a traffic channel carrying identical information, the multiple base stations vary the respective order of transmitting channel-coded coding bits, thereby enhancing the gain of an early termination method. Hereinafter, an example of having 2 base stations being in contact with the mobile station in soft handoff will be described with reference to FIG. 17 and FIG. 18.

Figure 17:
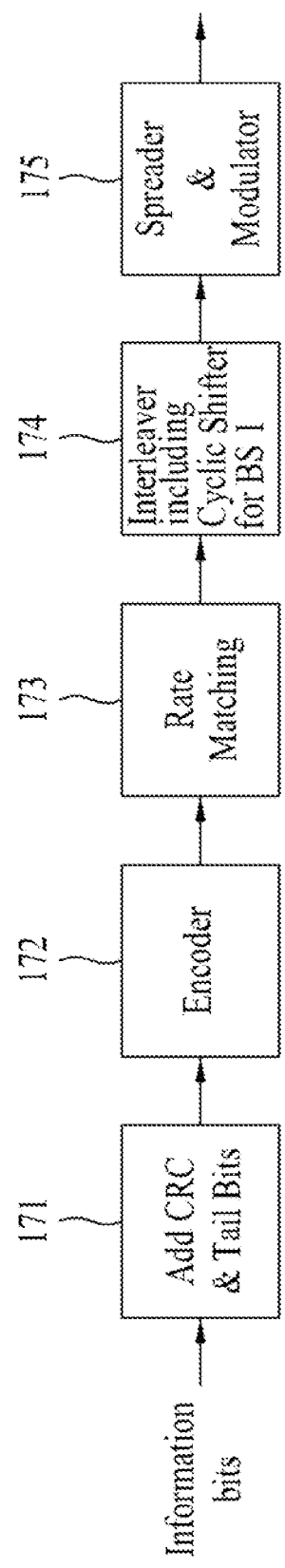
FIG. 17(a) illustrates the structure of a first base station according to the first embodiment of the present invention.
FIG. 17(b) illustrates the structure of a second base station according to the first embodiment of the present invention.
Figure 17:
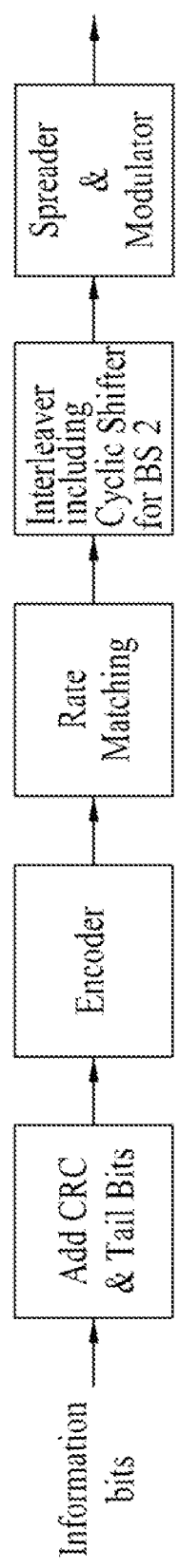

FIG. 17(*a*) illustrates the structure of a first base station according to the first embodiment of the present invention, and FIG. 17(*b*) illustrates the structure of a second base station according to the first, embodiment of the present invention.

As shown in FIG. 17(*a*) and (*b*), the base station according to the first embodiment of the present invention includes an add cyclic redundancy check (hereinafter referred to as "CRC") & tail bits unit 171, an encoder 172, a rate matching unit 173, an interleaver 174 including a cyclic shifter, and a spreader & modulator 175.

When an information bit sequence is inputted, the add CRC & tail bits unit 171 adds CRC and tail bits to the information bit sequence. The encoder 172 FEC encoded the information bit sequence.

The rate matching unit 173 performs rate matching, which matches the encoded information bit sequence to transmission bits of the channel. More specifically, rate matching is a process of matching the amount of data that are to be transmitted for each transmission time interval (TTI) with the maximum transmission amount of an actual channel.

The interleaver 174 cyclically shifts the conventional interleaving, which realigns the order of the information bit sequences by specific regions, and interleaves sequences. The spreader & modulator 175 spreads and modulates the cyclically shifted sequence. The modulated sequence is transmitted through a transmission antenna.

The interleaver 174 shifts a sequence as much as a predecided cyclic shift value. According to the first embodiment of the present invention, the cyclic shift value of the first base station is different from that of the second base station. If the sequence outputted from the interleaver is b0, b1, ..., bN−1, when the cyclic shift value of the cyclic shifter is equal to a, the bit sequence being outputted from the cyclic shifter becomes ha, ba+1, ..., bN−1, b0, b1, ..., ba−1. At this point, N represents the length of a sequence being outputted from the interleaver.

For example, in a CDMA 2000 system, when a handoff mobile station is in communication with two base stations, and when the two base stations FEC-channel-codes information bits, which are to be transmitted in a forward link, at a coding rate of ½, and when the cyclic shift value of the cyclic shifter of the first base station is equal to 0, and when the cyclic shift value of the cyclic shifter of the second base station is equal to N/2, the bit sequence being outputted from the cyclic shifter of the first base station is b0, b1, ..., bN−1, and the bit sequence being outputted from the cyclic shifter of the second base station bN/2, bN/2+1, ..., bN/2−1. Therefore, the first base station transmits data in the order of b0, b1, ..., bN−1, and the second base station transmits data in the order of bN/2, bN/2+1, ..., bN/2−1. Accordingly, when the handoff mobile station receives ½ of the 20 ms frame, the first base station receives the entire sequence (b0, b1, ..., bN−1). Therefore, when only ½ of the 20 ms frame is received, the receiving coding rate becomes ½, thereby increasing the possibility of a successful decoding process at the point of receiving the ½ of the 20 ms frame. Also, the possibility of a successful decoding process, when more than ¼ and less than ½ of the 20 ms frame is received, may be increased.

Also, in a forward link, when the base station FEC-channel-codes the information bits that are to be transmitted at the coding rate of ½, one information bit is modified to two parity bits. Thereafter, a first parity sequence and a second parity sequence interleaved by the interleaver are sequentially transmitted. When the first embodiment of the present invention is applied to such transmission method, the first base station transmits the interleaved first parity sequence to the handoff mobile station and, then, transmits the interleaved second parity sequence. The second base station transmits the interleaved second parity sequence and, then, transmits the interleaved, first parity sequence.

In the forward link, in order to send a power control command for a reverse link power control, a portion of coding bits of the traffic channel are punctured, and an F-PCSCH for sending the power control command is inserted therein. If the bit sequence transmitted by the multiple base stations, which are in communication with the handoff mobile station, is not cyclically shifted, the positions of the traffic channel punctured by the multiple base stations in order to transmit the F-PCSCH become identical to one another. Therefore, the same coding bits are punctured in each of the multiple base stations. However, as shown in the first embodiment of the present invention, if the multiple base stations cyclically shift bit sequences that are to be transmitted as much as each of the respective cyclic shift values, which are different from one another, the punctured positions in the traffic channel for transmitting the F-PCSCH becomes different in each of the multiple base stations. Therefore, additional coding gain may be obtained.

As shown in FIG. 17, the interleaves 174 may include a cyclic shifter, or the interleaver and the cyclic shifter may be embodied as a different element of the base station. If the interleaver 174 includes the cyclic shifter, each of the multiple base stations being in communication with the handoff mobile station may use a different interleaves pattern, so as to transmit the respective sequence in different orders.

For example, when 2 base stations are in communication with the handoff mobile station, the first base station may use a first interleaves pattern, and the second base station may use a second interleaver pattern. At this point, the sequence that is interleaved by using the second interleaver pattern corresponds to the cyclically shifted result of the sequence interleaved by using the first interleaver pattern.

When the length of an output sequence of the interleaver is 8, and when the sequence interleaved by using the second pattern cyclically shifted the sequence interleaved by using the first pattern by N/2, if the sequence interleaved by using the first pattern is b0, b1, ..., bN−1, the sequence interleaved by using the second pattern is bN/2, bN/2+1, ..., bN/2−1.

More specifically, when two base stations are in communication with a handoff mobile station, the cyclic shift value of the first base station may be equal to 0, and the cyclic shift value of the second base station may be equal to N/2.

Also, when more than two base stations are in communication with the handoff mobile station, the cyclic shift value of each base station may be equal to 0 or N/2.

Meanwhile, various cyclic shift values may be considered. For example, instead of multiples of ½, multiples of ¼ may be decided as the cyclic shift values. More specifically, when 2 or more base stations are in communication with the handoff mobile station, the cyclic shift value for each of the 4 base stations may be one of {0, N/4, 2*N/4, 3*N/4}.

In case the base station that is in communication with a handoff mobile station is changed, when the base station transmits a handover direction message to the mobile station, the newly added base station notifies the cyclic shift value that is being used and a. newly allocated decoding attempt point.

Figure 18:
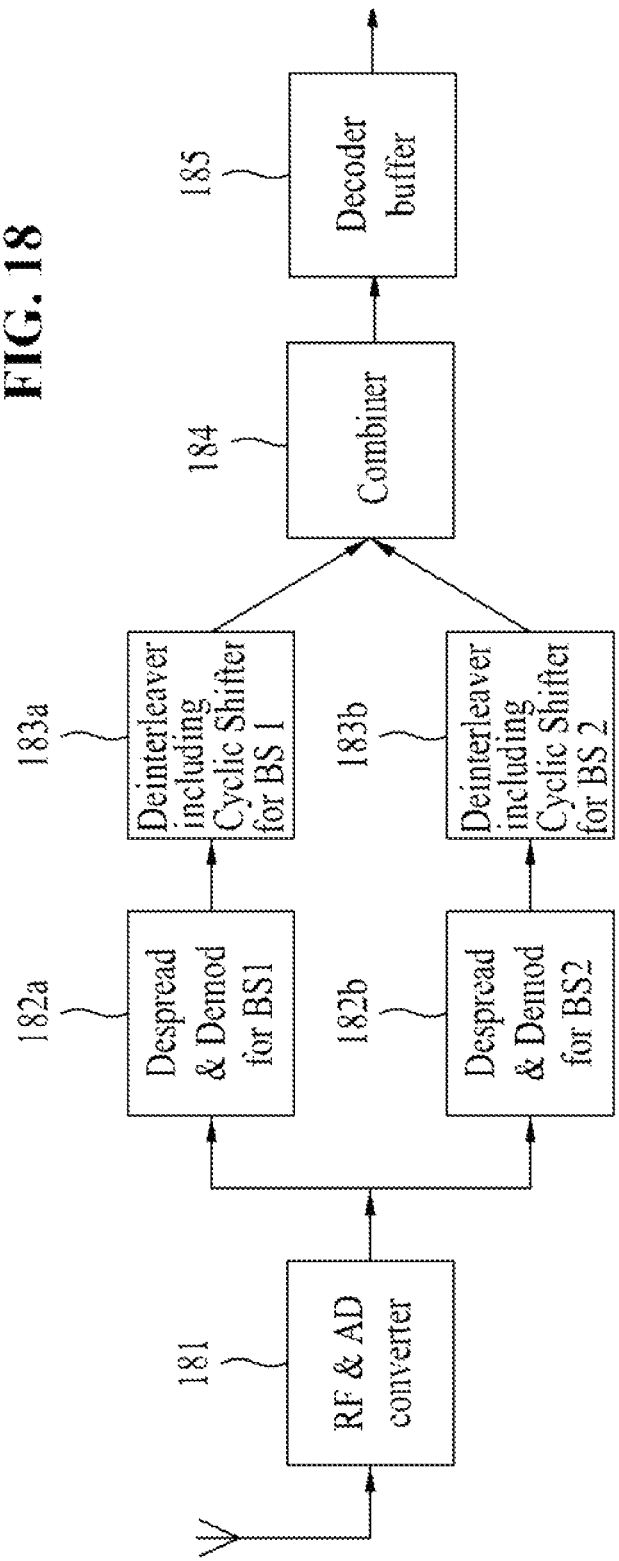
FIG. 18 illustrates the structure of a mobile station according to the first embodiment of the present invention.

FIG. 18 illustrates the structure of a mobile station according to the first embodiment of the present invention.

As shown in FIG. 18, the mobile station according to the first embodiment of the present invention includes a radio frequency & analog-to-digital converter (RF & AD converter) 181, a despreader & demodulator for the first base station (BSD 182a, a deinterleaver 183a for the first base station including the cyclic shifter for BS1, a despreader & demodulator for the second base station (BS1) 182b, a deinterleaver 183b for the second base station including a cyclic shifter for BS1, a combiner 184 combining information deinterleaved by each base station, and a decoder buffer 185.

The RF & AD converter 181 converts the received analog signal to a digital signal. The despreader & demodulator for BS1 182a despreads and demodulates the signal received from the first base station. And, the deinterleaver 183a for the first base station including the cyclic shifter for BS1 cyclically shifts the signal received from the first base station while taking into consideration the cyclic shift value of the first base station. Thereafter, the deinterleaver 183a deinterleaves the cyclically shifted received signal. At this point, the cyclic shifter and the deinterleaver 183a may be respectively realised as separate elements of the mobile station.

Also, the despreader & demodulator for BS2 182*b* despreads and demodulates the signal received from the second base station. And, the deinterleaver 183*b* for the second base station including the cyclic shifter for BS2 cyclically shifts the signal -received from the second base station while taking into consideration the cyclic shift value of the second base station. Thereafter, the deinterleaver 183*b* deinterleaves the cyclically shifted received signal. At this point, the cyclic shifter and the deinterleaver 183*b* may be respectively realised as separate elements of the mobile station.

Furthermore, the de interleaved signal of the first base station and the deinterleaved signal of the second base station are combined to a single signal by the combiner 184, thereby being stored in the decoding buffer 185. Thus, the mobile station combines the deinterleaved signal of the first base station and the deinterleaved signal of the second base station, thereby decoding the combined signal. Prior to receiving the entire frame, when the mobile station attempts data decoding during the frame reception, and when the data reception is successful, the mobile station transmits an ACK to the base station through a reverse acknowledge (ACK) channel. Then, the base station receiving the ACK stops (or discontinues) transmission of the corresponding frame. At this point, the point where the mobile station attempts to perform decoding (or the decoding attempt point of the mobile station) may e notified to the mobile station by the base station. As shown in the first embodiment of the present invention, when the mobile station combines a signal of the first base station and a signal of the second base station and decodes the combined signal, the possibility of an early termination may be increased.

Hereinafter, the method of transmitting and receiving data in a soft handoff according to a second embodiment of the present invention will now be described in detail.

According to the second embodiment of the present invention, two or more base stations that are in communication with a mobile station in soft handoff FEC-channel-codes data that are to be transmitted by using a convolutional code. Herein, each of the two or more base stations use a different convolutional code generating polynomial. And, since the mobile station combines the signals received from the two or more base station and decodes the combines signal, the coding rate may become lower than the coding rate of one base station, thereby enhancing the gain of the early termination method.

Figure 19:
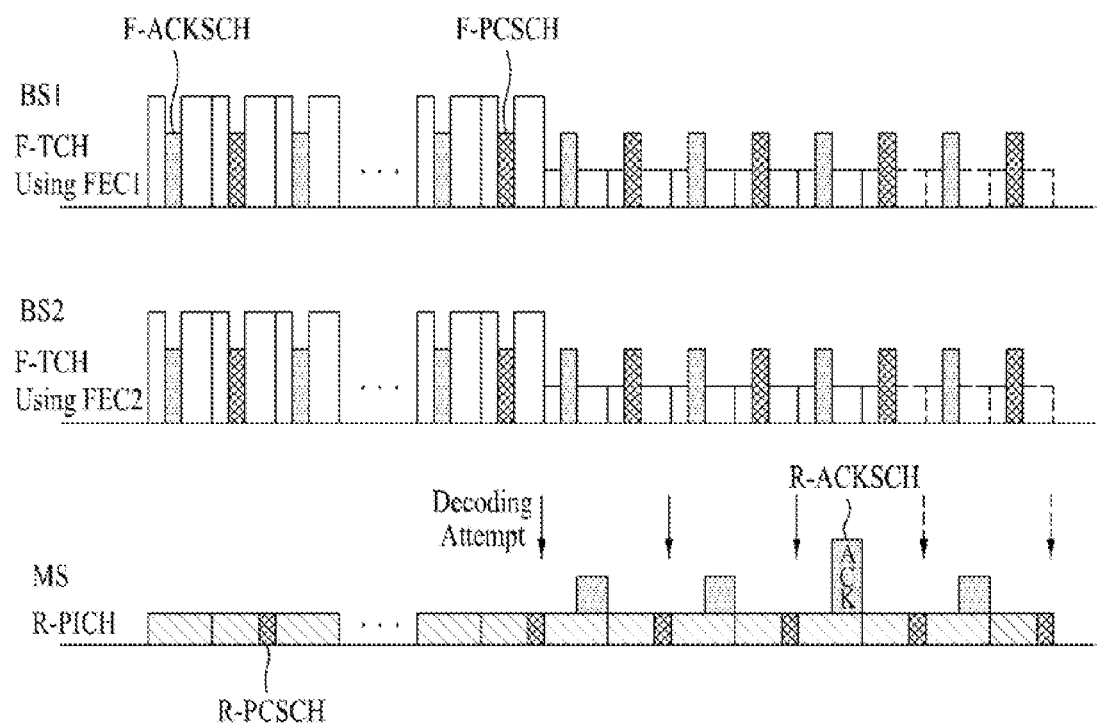
FIG. 19 illustrates method of transmitting and receiving data in a soft handoff according to a second embodiment of the present invention.

FIG. 19 illustrates method of transmitting and receiving data in a soft handoff according to a second embodiment of the present invention.

Referring to FIG. 19, the mobile station in soft handoff is in communication with two base stations, and the two base stations use a convolutional code having the coding rate of ½, so as to FIC-channel-code data that are to be transmitted. Herein, each of the first base station and the second base station uses a different convolutional code generating polynomial. Accordingly, since the mobile station combines the signal received from each of the first base station and the second base station and decodes the combined signal, the coding rate becomes ¼, and the possibility of performing a successful decoding process, when less than ½ of the frame is received, may be increased.

When the coding rate of the base station is ½, and when the length of the frame is 20 ms, since a mobile station that is not in a soft handoff environment has 0 possibility of performing a successful decoding process, when only less than ½ of the frame is received, a decoding attempt point positioned at more than 10 ms is allocated by the base station. However, when the mobile station that was not in a soft handoff region shifts to a soft handoff region, so as to be in communication with multiple base stations, the mobile station is additionally allocated with a decoding attempt point located within 10 ms.

Also, in case the base station that is in communication with the handoff mobile station is changed, when the base station transmits a handover direction message to the mobile station, the newly added base station notifies a cyclic shift value used by the base station and a newly allocated decoding attempt point. Furthermore, the decoding attempt points are pre-decided based upon the number of base stations being in communication with the handoff mobile station, and the mobile station may attempt to perform decoding at the pre-decided decoding attempt points.

In this embodiment of the present invention, a method of designing a convolutional code, which is to be used by two base stations, when the handoff mobile station is in communication with 2 base stations, will be described.

Figure 20B:
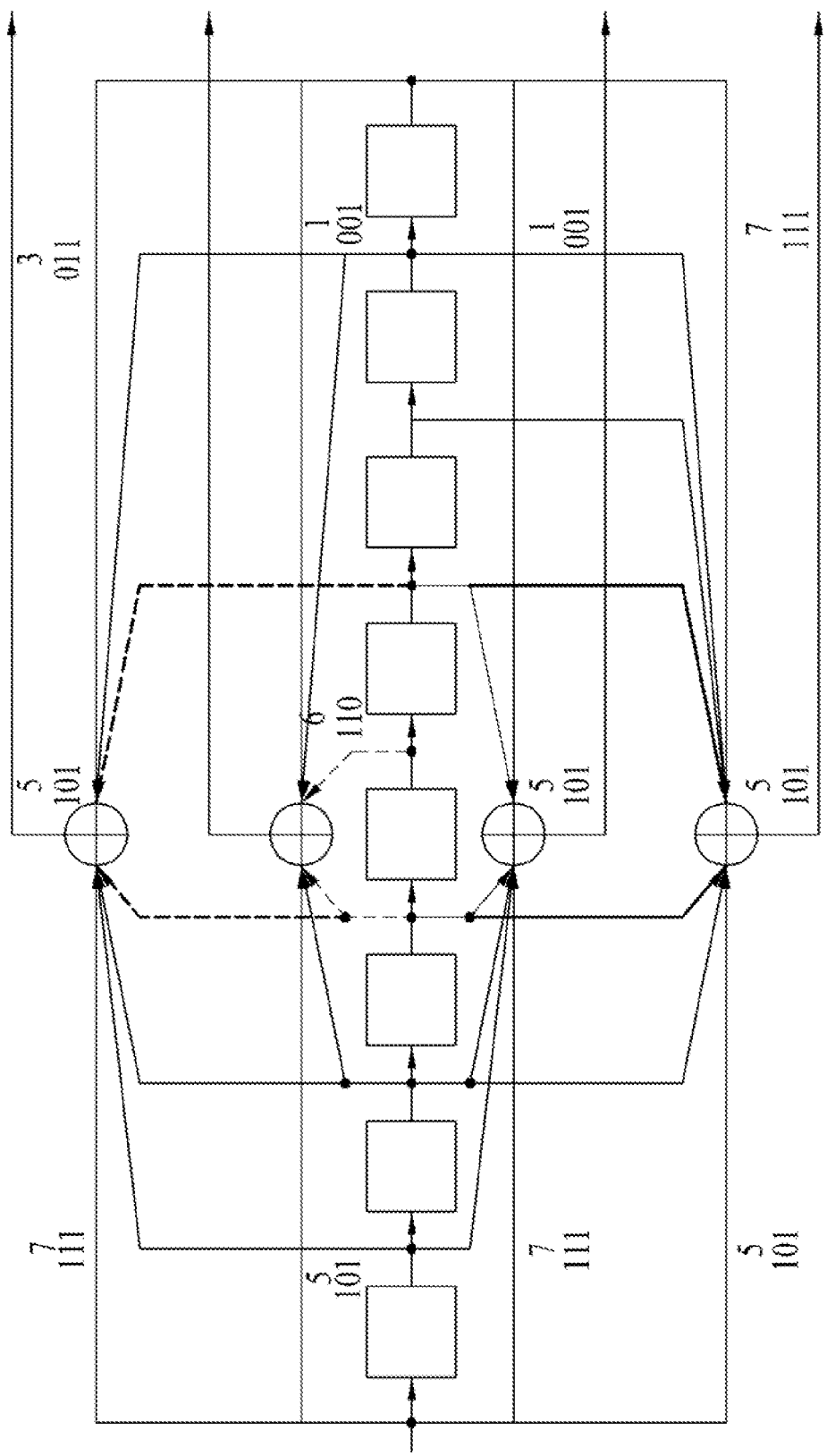
FIG. 20(b) illustrates an encoder structure having the two convolutional codes combined therein.

FIG. 20(*a*) illustrates an encoder structure of a convolutional code having a generating polynomial of (561,753) and an encoder structure of a convolutional code having a generating polynomial of (557,751), And, FIG. 20(*b*) illustrates an encoder structure having the two convolutional codes combined therein.

Two convolutional codes each having a different generating polynomial respectively generate a different code word, even when the input sequence is the same. However, as shown in FIG. 20(*b*), the two convolutional codes each having a different generating polynomial may be combined with a convolutional code having a low coding rate.

When it is assumed that each of the two base stations being in communication with the mobile station in soft handoff uses a convolutional code having the coding rate of ½, since the mobile station combines each of the different codes respectively received from the two base stations, the coding rate becomes ¼. Therefore, the generating polynomials used by the two base stations should foe decided in a way that the combined convolutional codes having the coding rate of ¼ show excellent performance.

Also, since the mobile station communicates with one base station immediately before and after the handoff process, the generating polynomials used by the two base stations should be decided in a way that each of the two convolutional codes having the coding rate of ½ show excellent performance. More specifically, before initiating the handoff process, the mobile station communicates with a serving base station. And, after the handoff process, since the mobile station communicates with a target base station, the performance of the ½-rate convolutional codes used by each of the two base stations is as important as the performance of the combined convolutional code having the coding rate of ¼.

However, when faking into consideration the fact that the coding gain of the ¼-coding rate is much greater than the coding gain of the ½-coding rate, the performance of ½-rate convolutional code used by each base station should be first considered.

Therefore, in the second embodiment of the present invention, the standard, for designing the convolutional codes that are to be used by the two base stations consists of, firstly, showing excellent performance of the ½-rate convolutional codes used by each of the two base stations, and secondly, preferably showing a high performance of the combined convolutional code having the coding rate of ¼.

Table 5 shows generating polynomials when the coding rate is ½, and when a constraint length corresponds to K=9.

TABLE 5

| Notation | Generating polynomial in octal | $d_\infty$ (free distance) |
|---|---|---|
| Johannesson | 557, 751 | 12 |
| Chambers | 515, 677 | 12 |
| 3GPP2 | 561, 753 | 12 |

Among the generating polynomials shown in Table 5, the generating polynomial showing the most excellent performance is (561, 753). Therefore, the generating polynomial (561, 753) is selected. And, hereinafter, an example of when the selected generating polynomial (561, 753) is combined with a generating polynomial (557, 751) and an example of when the selected generating polynomial (561, 753) is combined with a generating polynomial (515, 677) will now be analyzed.

Table 6 shows the combination of the generating polynomials.

TABLE 61

| | Generating polynomial in octal | | |
|---|---|---|---|
| Notation | 1st ½ code | 2nd ½ code | Combined ¼ code |
| 3GPP2 + Johannesson | (561, 753) | (557, 751) | (561, 753, 557, 751) |
| 3GPP2 + Chambers | (561, 753) | (515, 677) | (561, 753, 515, 677) |

Figure 21:
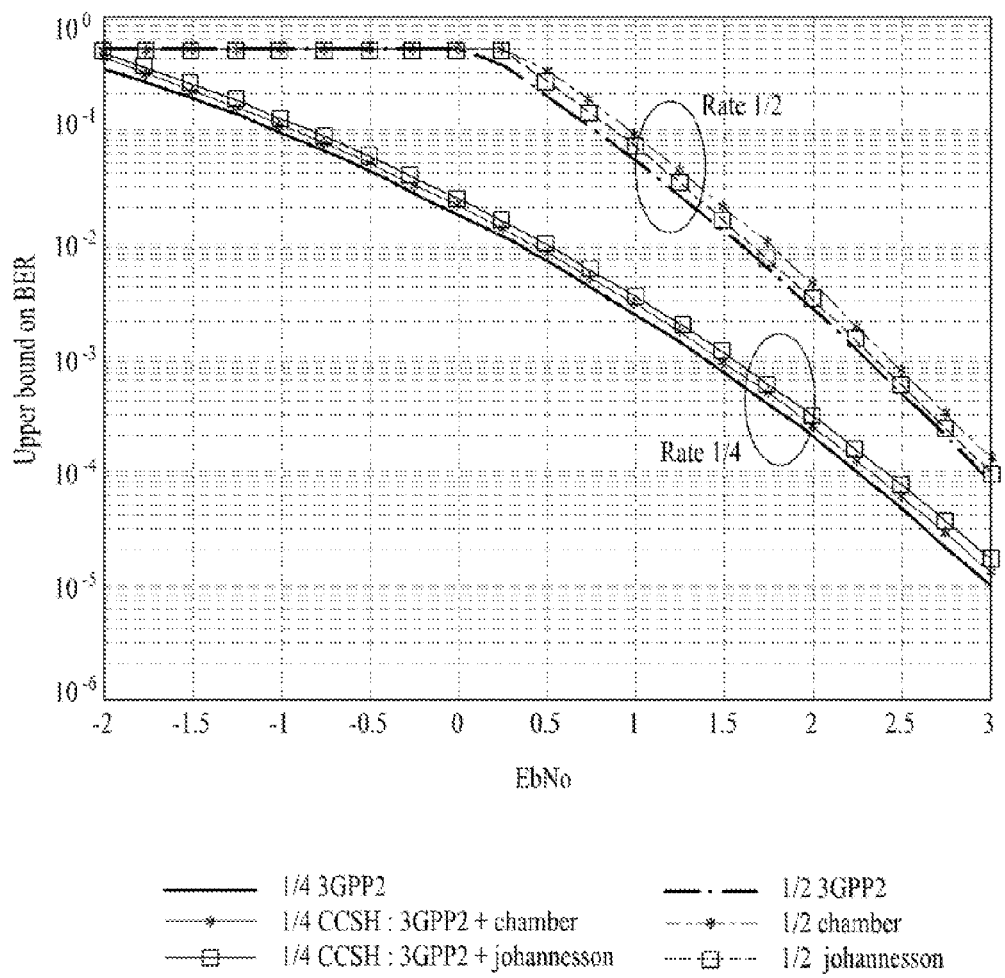
FIG. 21 illustrates an upper bound on a bit error rate (BER) of each of the ½-rate codes and the combined ¼-rate code.

FIG. 21 illustrates an upper bound on a bit error rate (BER) of each of the ½-rate codes and the combined ¼-rate code.

Referring to FIG. 21, when the coding rate is ¼, the performance of the 3GPP2+Johannesson may become slightly deteriorated. However, it is apparent that, when the coding rate is ½, 3GPP2+Johannesson shows the most, excellent performance. When the coding rate is ¼, the performance of a ¼-rate 3GPP2+Johannesson code does not show much difference from the ¼ 3GPP2 code, which shows the most excellent performance. Therefore, according to the standard of the second embodiment of the present invention, the 3GPP2+Johannesson code is selected.

Hereinafter, the method of transmitting and receiving data in a soft handoff according to a third embodiment of the present invention will now be described in detail.

According to the third embodiment of the present invention, when rate matching the data that are to be transmitted, each of the multiple base stations that are in communication with a mobile station in soft handoff uses a different rate matching pattern, so as to enhance the additional coding rate and the gain in the early termination method.

Figure 22:
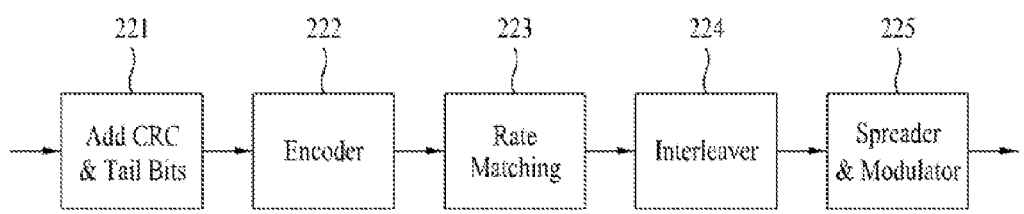
FIG. 22 illustrates the structure of a base station according to a third embodiment of the present invention.

FIG. 22 illustrates the structure of a base station according to a third embodiment of the present invention.

As shown in FIG. 22, the base station according to the third embodiment of the present invention includes an add CRC & tail bits unit 221, an encoder 222, a rate matching unit 223, an interleaver 224, and a spreader & modulator 225.

When an information bit sequence is inputted, the add CRC & tail bits unit 221 adds CRC and tail bits to the information bit sequence. The encoder 222 FEC encoded the information bit sequence.

The rate matching unit 223 performs rate matching, which matches the encoded information bit sequence to transmission bits of the channel. More specifically, rate matching is a process of matching the amount of data that are to be transmitted for each transmission time interval (TTI) with the maximum transmission amount of an actual channel. At this point, each of the multiple base stations being in communication with the handoff mobile station uses a different rate matching pattern. Accordingly, the sequences being transmitted by each of the multiple base stations become different from, one another.

The interleaver 224 cyclically shifts the conventional interleaving, which realigns the order of the information bit sequences by specific regions, and interleaves sequences. The spreader & modulator 225 spreads and modulates the cyclically shifted sequence. The modulated sequence is transmitted through a transmission antenna by passing through the RF end.

Hereinafter, a radio configuration according to an embodiment of the present invention will now be described.

When the above-described methods for enhancing voice (or audio) capacity are applied to a wireless communication system, the maximum number of users that can be accommodated by the wireless communication system can be increased. However, since the traffic channel is identified by a walsh code in the forward link of the CDMA system, the number of traffic channels that can be supported by the CDMA system is limited by the number of walsh codes. In the forward link of the CDMA 2000 system, since each voice (or audio) traffic channel is defined by a walsh code having the length of 128, unless the code is expanded by using a quasi-orthogonal code, the maximum number of supportable voice (or audio) traffic channels in a forward link of 1.25 MHz cannot exceed 128.

When the mobile station is in a handoff region, since the traffic channel is allocated from the multiple base stations, a waist code support for each of the multiple base stations is used. More specifically, when the mobile station is in an N-way handover region having N number of sectors set therein as active sectors, a 128-length walsh code is allocated from each of the N number of sectors.

When all mobile stations are in a non-handover region, a maximum number of 128 users may be accommodated in a 1.25 MHz band per sector. However, when all mobile stations are in a 2-way handover region, the number of users actually being accommodated in the 1.25 MHz band per sector is reduced to 64 users. More specifically, as the number of mobile stations in the handover region increases, and as the number of active sectors in the handover regions increases, the maximum number of users that can actually be accommodated for each sector reduces.

In this embodiment of the present invention, in order to economize (or save) walsh code support that is excessively required during the handover process, the walsh code is time-divided so as to form a basic channel, thereby performing channel allocation by the respective units. Therefore, the conventional circuit channel is defined by a walsh. code index according to a walsh code length. However, according to the embodiment of the present invention, the basic channel is defined by a walsh code index according to a walsh code length and a time index.

For example, when one basic channel is defined by an even-numbered PCG of a walsh code index, and when another basic channel is defined by an odd-numbered PCG, two basic channels may be defined by using only one walsh code.

In another example, when one basic channel is defined by the first 10 ms of a 20 ms frame of a single walsh code index, and when another basic channel is defined by the next 10 ms of the same 20 ms frame, two basic channels may be defined by using only one walsh code.

Furthermore, one walsh code may foe time-divided, so as to divide 3 or more basic channels.

When a single walsh code is time-divided to define a plurality of basic channels, each of the basic channels may have a transmission coding rate of 1 or more. In this case, in order to allow the receiving end to successfully receive data, the transmitting end transmits the same data to the plurality of basic channels, so that the combined coding rate of the receiving end becomes less than 1.

Figure 23:
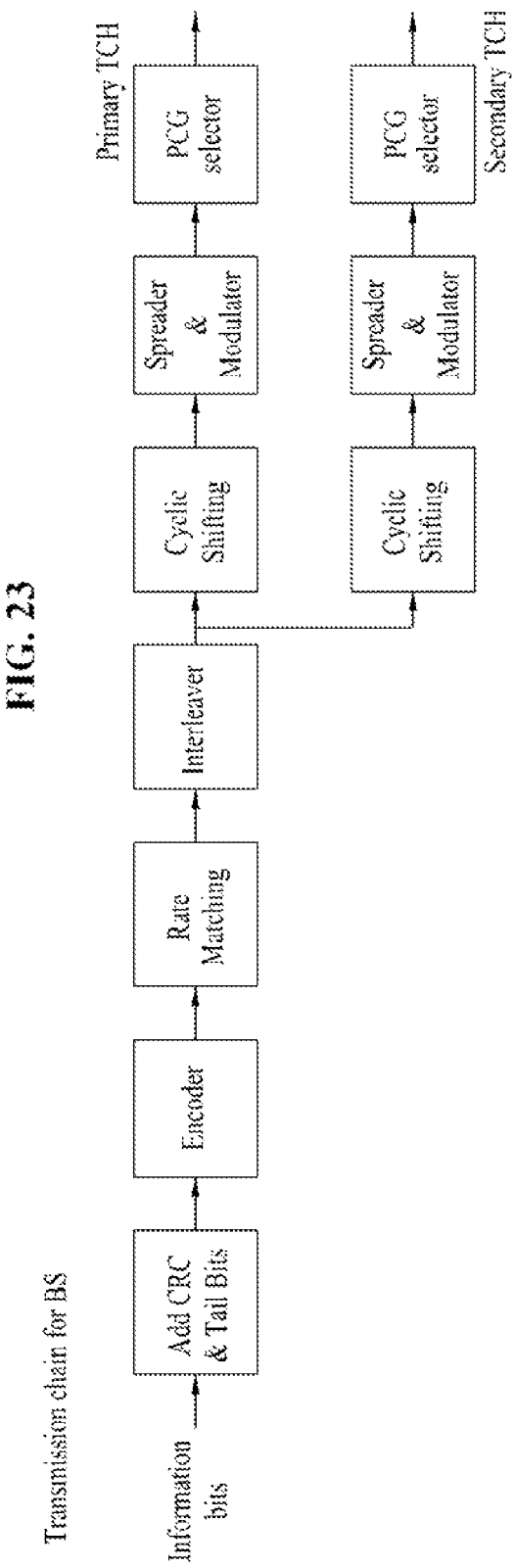
FIG. 23 illustrates an example of a transmission chain of a transmitting end using a wireless structure according to the embodiment of she present invention.

FIG. 23 illustrates an example of a transmission chain of a transmitting end using a wireless structure according to the embodiment of the present invention.

As shown in FIG. 23, in the transmission chain of the transmitting end using a wireless structure according to the embodiment of the present invention, the traffic channel consists of two basic channels, i.e., a forward primary traffic channel (hereinafter referred to as "IF-PTCH") and a forward secondary traffic channel (hereinafter referred to as "F-STCH").

FIG. 23 illustrates an example wherein one walsh code is time-divided to an even-numbered PCG and an odd-numbered PCG so as to define two basic channels, and wherein the traffic information is coded at a coding rate of ½, and wherein the same traffic information is being transmitted to two basic channels. In this case, the coding rate of each basic channel becomes 1. And, in order for the receiving end to successfully receive information, the receiving end should receive the same traffic information from two or more basic channels.

Referring to FIG. 23, each of the basic channels receives a bit sequence, which has passed, through the same interleaver, so as to independently perform cyclic shift for each basic channel. Then, the cyclically shifted result is spread and modulated by using the walsh code allocated to each basic channel, thereby transmitting a signal from the PCG allocated to each basic channel. Herein, a signal is not transmitted from a non-allocated PCG. In FIG. 23, the order of the spreading & modulator and the PCG selector may be changed.

A mobile station in a non-handover region is allocated with two basic channels, F-PTCH and F-STCH, in order to successfully receive traffic information. When the cyclic shift values of the F-PTCH and the F-STCH are equal to 0, an when the walsh code index of each of the F-PTCH and the F-STCH is identical to one another, and when the F-PTCH is allocated to an odd-numbered PCG of the frame, and when the F-STCH is allocated to an even-numbered PCG of the frame, the transmission signal of the transmitting end according to the embodiment of the present invention becomes identical to the transmission signal of the related art transmitting end.

Figure 24:
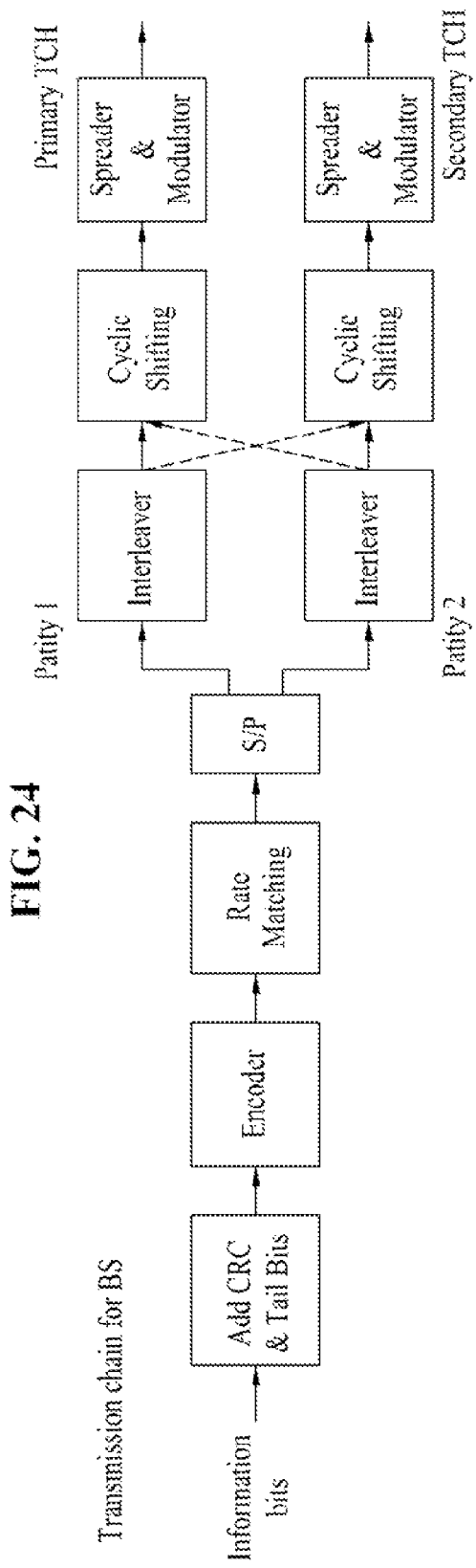
FIG. 24 illustrates another example of a transmission chain of a transmitting end using a wireless structure according to the embodiment of the present invention.

FIG. 24 illustrates another example of a transmission chain of a transmitting end using a wireless structure according to the embodiment of the present invention.

As shown in FIG. 24, a rate-matched bit sequence is divided into two sequences by a serial to parallel block (or unit). Then, each of the sequences is interleaved and cyclically shifted, thereby being spread and modulated. Also, the modulated signal is mapped to a PCG allocated to the basic channel, so as to be transmitted.

An example of using a wireless structure according to an embodiment of the present invention in a soft handover environment will now be described.

Figure 25:
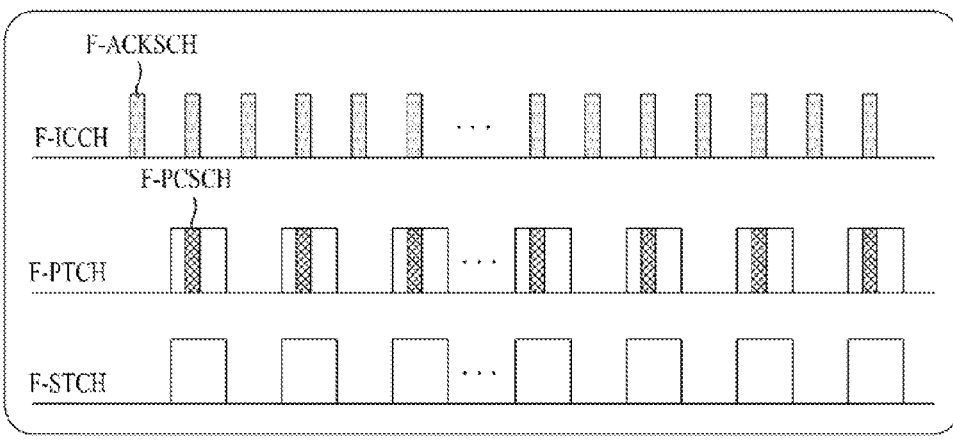
FIG. 25 illustrates a communication process between two base station using wireless structures and a handoff mobile station according to the embodiment of the present invention.
Figure 25:
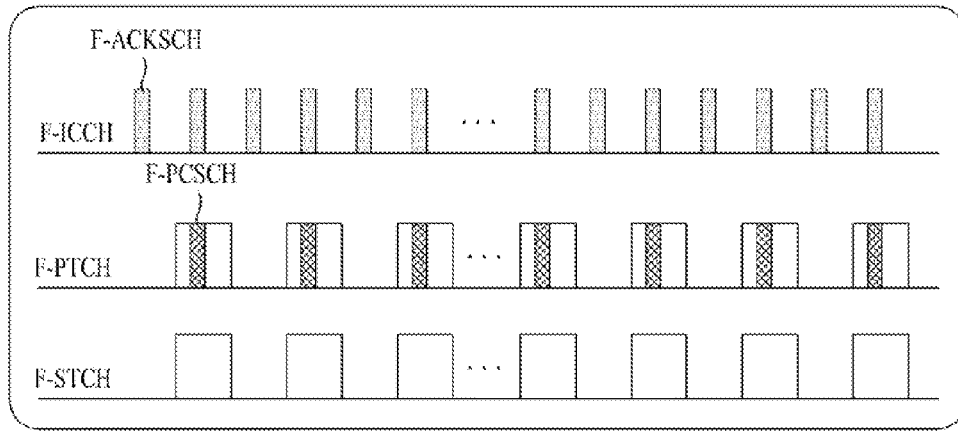
Figure 25:
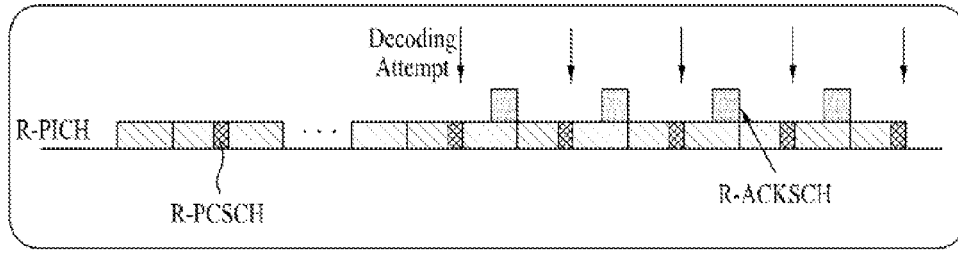

FIG. 25 illustrates a communication process between two base station using wireless structures and a handoff mobile station according to the embodiment of the present invention.

Referring to FIG. 25, when the cyclic shift value of the F-PTCH is equal to 0, when length of an output sequence of the interleaver is N, and when the cyclic shift value of the F-STCH is equal to N/16, when the walsh code index of each of the F-PTCH and the F-STCH is identical to one another, and when the F-PTCH and the F-STCH are both allocated to odd-numbered PCGs of the frame, thereby being transmitted, the signal transmission has a 50% duty cycle in PCG units. Thus, when combined with the early termination method, the power of the signal being unnecessarily transmitted during the process of completing the early termination and receiving the ACK feedback can be reduced.

Figure 26:
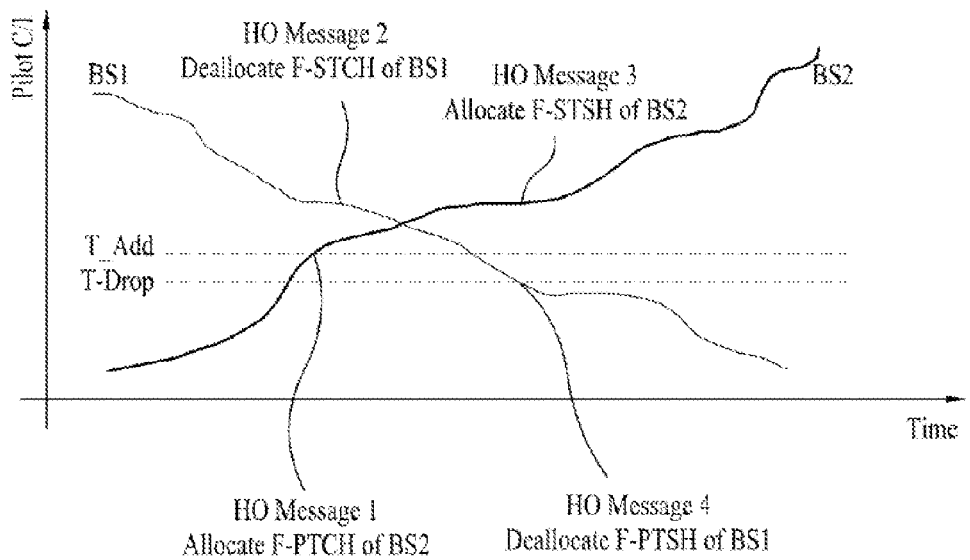
FIG. 26 illustrates an exemplary handoff process, when using a wireless structure, according to an embodiment of the present invention.
Figure 27:
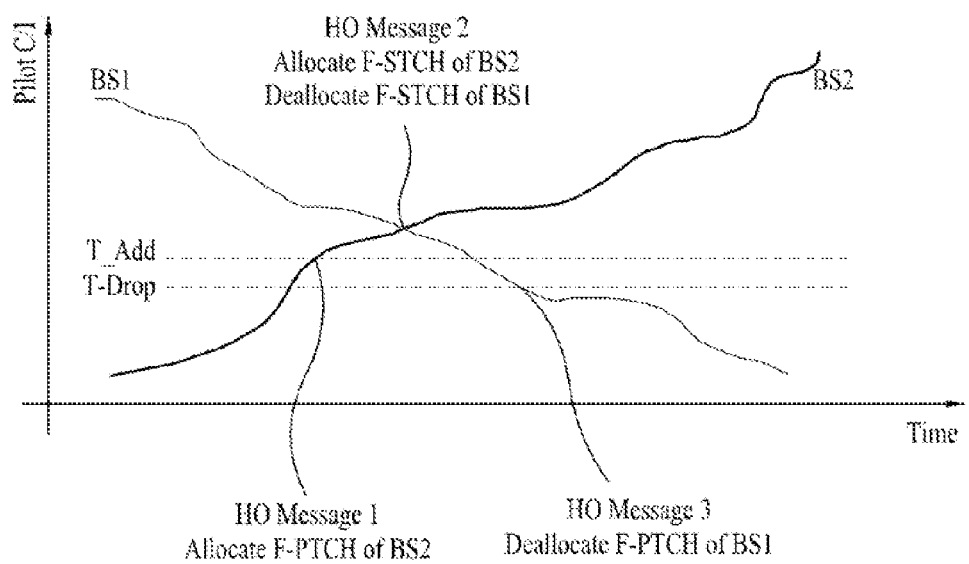
FIG. 27 illustrates another exemplary handoff process, when using a wireless structure, according to an embodiment of the present invention.

FIG. 26 illustrates an exemplary handoff process, when using a wireless structure, according to an embodiment of the present invention. And, FIG. 27 illustrates another exemplary handoff process, when using a wireless structure, according to an embodiment of the present invention.

Referring to FIG. 26, when the mobile station is connected to the first base station (BS1), the mobile station received data from the first base station through the F-PTCH and the F-STCH. At this point, the cyclic shift value of the F-PTCH is equal to 0, and the cyclic shift value of the F-STCH is equal to N/16.

Thereafter, the mobile station shifts towards the second base station (BS2), and when a carrier (or pilot signal) to interference ratio (hereinafter referred to as "C/I") exceeds a traffic channel add threshold value (T_ADD threshold), a base station controller (BSC) notifies the mobile station that the F-PTCH of the second base station has been allocated to the mobile station through a handover message. Accordingly, after normally receiving the F-PTCH of the second base station, when the mobile station transmits a handover complete message to the base station controller, the base station controller may verify that the handover process of the mobile station has been completed. At this point, when the cyclic shift value of the F-PTCH of the second base station is (N/2+N/16), the gain of a code union soft handoff may be maximised.

Also, when the pilot C/I of the first base station is lower than a predetermined threshold value, the base station controller notifies the mobile station that the F-STCH of the first base station has been de-allocated through a handover message. Once the mobile station has normally received the message and has transmitted the handover complete message to the first base station, the first base station stops (or discontinues) the transmission of the F-STCH and, then, retrieves the walsh code source that had been allocated to the mobile station.

When the mobile station, shifts further towards the second base station, and when the pilot C/I received from the second base station becomes higher than the predetermined threshold value, the base station controller notifies the mobile station that the F-STCH of the second base station has been allocated to the mobile station through a handover message. At this point, when the cyclic shift value of the F-PTCH of the second base station is N/2, the gain of a code union soft handoff may be maximised.

Furthermore, when the pilot C/I received from the first base station becomes lower than t traffic channel drop threshold (T_Drop threshold) value, the base station, controller notifies the mobile station that the F-PTCH of the first base station has been de-allocated (or dropped) through a handover message. Once the mobile station has normally received the handover message and has transmitted the handover complete message to the first base station, the first base station stops (or discontinues) the transmission of the F-PTCH and, then, retrieves the walsh code source that had been allocated to the mobile station.

In the example shown in FIG. 26, between the transmission point of the second handover message and the transmission point of the third handover message, the first base station and the second base station transmits only the F-PTCH to the mobile station.

In FIG. 27, the de-allocation of the F-STCH of the first base station and the allocation of the F-STCH of the second base station occur simultaneously. More specifically, the mobile station may be allocated with the F-PTCH from, N number of base stations in an N-way handover region. And, then, the mobile station may be allocated with the F-STCH from the best single base station. Alternatively, the mobile station may be allocated with the F-PTCH from M number of base stations in an N-way handover region. And, then, the mobile station may also be allocated with the F-STCH from some of the N number of base stations.

As described above, when a wireless structure according to the embodiment of the present invention is used, the walsh code source allocated from each base station within the N-way handover region is reduced to half as compared to the conventional method. Thus, the walsh code source deficiency phenomenon may be resolved.

In the example shown in FIG. 25, both the F-PTCH and the F-STCH are allocated to the odd-numbered PCG of all frames. Therefore, the early termination gain may be increased. However, problem of unbalance in the usage rate of the walsh code source corresponding to the odd-numbered PCG and the even-numbered PCG may occur. Therefore, in order to resolve this problem, a method enabling each of the F-PTCH and the F-STCH to be independently and flexibly allocated with a PCG is proposed.

In FIG. 25, the F-PCSCH is punctured in the F-PTCH and then transmitted. Here specifically, during the F-PTCH allocation process, the allocation of the F-PCSCH is performed simultaneously. Conversely, a control channel is punctured in the F-STCH, and so, allocation does not occur herein. Therefore, in the handover process, the mobile station is allocated with the F-PTCH from all base stations of the active sector, and the mobile station is allocated with the F-STCH when required. Also, for the early termination of the reverse link channel, the base station transmits the F-ACKSCH in a forward direction. However, in FIG. 25, the F-ACKSCH is time division multiplexed (by a time division multiplexer (TDM)) with other indication signals and transmitted to a forward-indicator control channel (hereinafter referred to as "F-ICCH").

Figure 28:
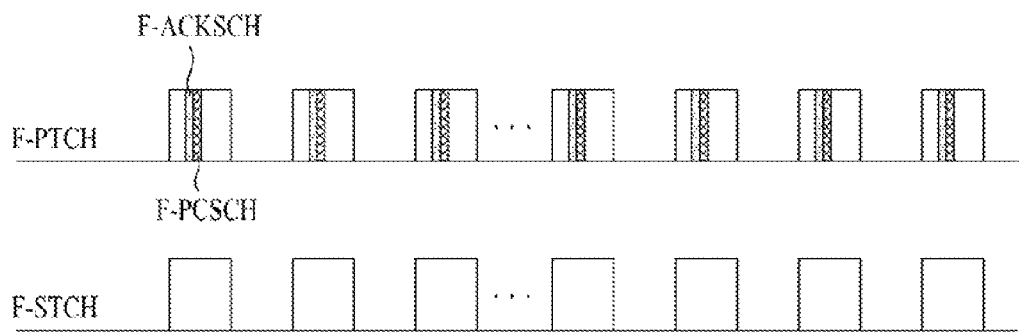
FIG. 28 illustrates an exemplary structure of an F-PGSCH and F-ACKSCH control channel, when using the wireless structure according to the embodiment of the present invention.

FIG. 28 illustrates an exemplary structure of an F-PCSCH and F-ACKSCH control channel, when using the wireless structure according to the embodiment of the present invention.

In FIG. 28, the base station does not additionally use the F-ICCH, but punctures the F-PCSCH and the F-ACKSCH in the F-PTCH, which is then transmitted. In the example shown in FIG. 28, a walsh code source for the F-ICCH is not required. However, there is a disadvantage in that the F-PTCH is excessively punctured.

Figure 29:
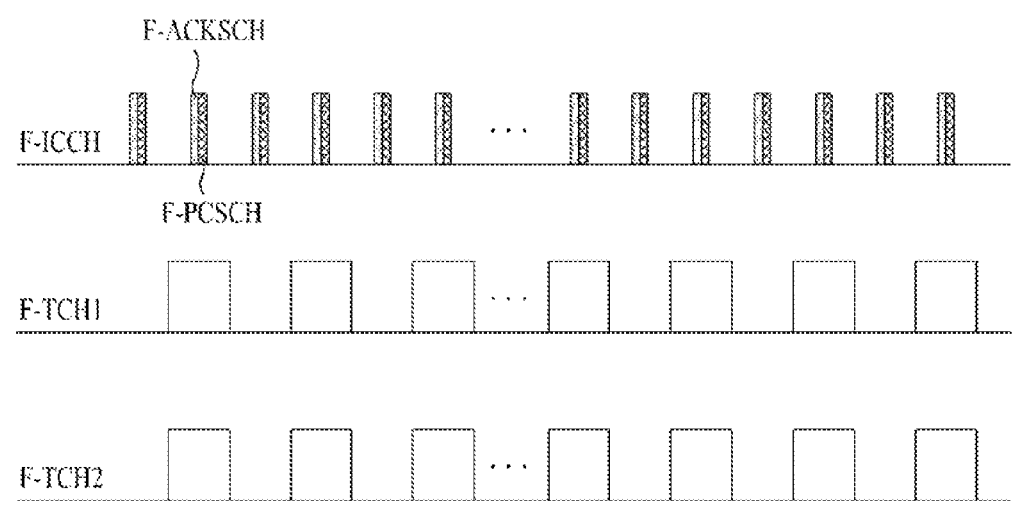
FIG. 29 illustrates another exemplary structure of an F-PCSCH and F-ACKSCH control channel, when using the wireless structure according to the embodiment of the present invention.

FIG. 29 illustrates another exemplary structure of an F-PCSCH and F-ACKSCH control channel, when using the wireless structure according to the embodiment of the present invention.

In FIG. 29, the base station time-division multiplexes the F-PCSCH and the F-ACKSCH in the F-ICCH with other indication signals, which are then transmitted. The example shown in FIG. 29 is advantageous in that the transmission rate of the power control command and the transmission rate of the ACK may be selected freely. Also, since there are no priority levels for the basic channels, in allocating channels, the allocation and de-allocation of the F-TCH1 and the F-TCH2 may be decided freely.

Figure 30:
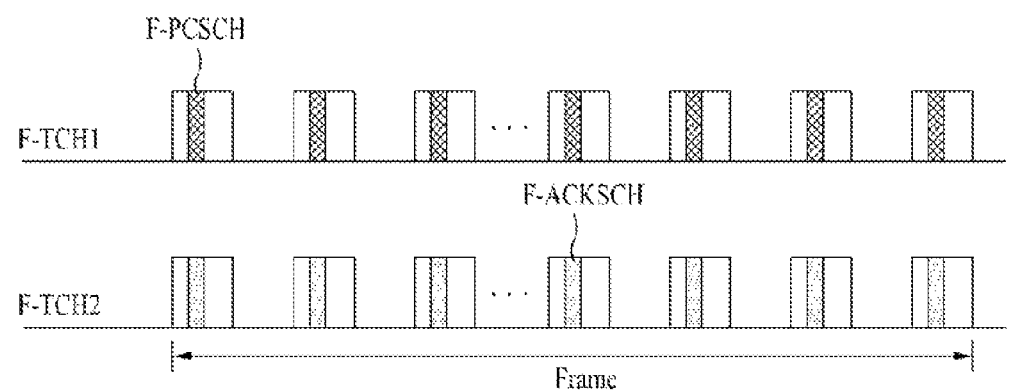
FIG. 30 illustrates yet another exemplary structure of an F-PCSCH and F-ACKSCH control channel, when using the wireless structure according to the embodiment of the present invention.

FIG. 30 illustrates yet another exemplary structure of an F-PCSCH and F-ACKSCH control channel, when using the wireless structure according to the embodiment of the present invention. In FIG. 30, the base station punctures the F-PCSCH in the F-TCH1, which is then transmitted, and, also, punctures the F-ACKSCH in the F-TCH2, which is then transmitted.

The embodiments of the present invention may be realised by diverse means, such as hardware, firmware, software, and a combination of hardware, firmware, and/or software, When realizing the embodiment of the present invention in the form of hardware, a sleep mode operation method in the wireless communication system according to an embodiment of the present invention may be realized by one or a combination of application specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, and so on.

When realizing the embodiment of the present invention in the form of firmware or software, a sleep mode operation method in the wireless communication system according to an embodiment of the present invention may be realised in the form of a module, process, function, and so on, which perform the above-described functions and/or operations. A software code may be stored, in a memory unit and operated by a processor. The memory unit may be located within or outside of the processor, thereby receiving and transmitting data from and to the processor by using a variety disclosed means.

It will be apparent to those skilled in the art that various modifications and variations can be made in the present, invention without departing from the technical and essential spirit or scope of the invention. Therefore, the detailed description of the present invention should not be interpreted as limiting in all aspects of the present invention, but should be considered as exemplary. The scope of the appended claims of the present invention shall be decided based upon rational interpretation, and all modifications within the scope of the appended claims and their equivalents will be included in the scope of the present invention.

Thus, it is intended that the present invention cover the modifications and variations of this invention provided they come within the scope of the appended claims and their equivalents.

It will also be apparent that preferred embodiments may be configured by combining non-cited claims within the scope of the appended claims or may be added as newly amended claims after the filing of the patent application of the present invention.

According to the embodiments of the present invention, each of the multiple base stations being in communication with a mobile station in a soft handoff environment uses a different pattern or code in order o transmit data. Thus, the gain in early termination in the handoff environment may be enhanced.

The advantages of the invention are not limited only to the advantages pointed out in the description set forth herein, and other advantages may be realised and attained by the structure particularly pointed out in the written description and claims hereof as well as the appended drawings.

What is claimed is:

1. A method of transmitting an acknowledgement at a mobile station in a soft handoff in a wireless communication system, the method comprising:
   transmitting the acknowledgement at a specific time,
   wherein the mobile station attempts decoding a frame earlier than a predetermined duration of the frame, wherein the decoding is performed using a first transmission from a first base station and a second transmission from a second base station,
wherein a first interleaver pattern is applied to the first transmission,
wherein a second interleaver pattern is applied to the second transmission,
wherein the specific time is after a successful decoding of the frame and is within the predetermined duration of the frame, and
wherein a first interleaved result of the first transmission is cyclically shifted by one-half a length with respect to a second interleaved result of the second transmission.

2. The method according to claim 1,
wherein the specific time is specified by the first base station.

3. The method according to claim 1,
wherein the first transmission and the second transmission are encoded with convolutional codes.

4. The method according to claim 1,
wherein the decoding is performed by combining the first transmission and the second transmission within the predetermined duration of the frame.

5. The method according to claim 1,
wherein the predetermined duration of the frame is 20 ms.

6. A mobile station for transmitting an acknowledgement in a soft handoff in a wireless communication system, the mobile station comprising:
a transmitter configured to transmit the acknowledgement at a specific time,
wherein the mobile station attempts decoding a frame earlier than a predetermined duration of the frame,
wherein the decoding is performed using a first transmission from a first base station and a second transmission from a second base station,
wherein a first interleaver pattern is applied to the first transmission,
wherein a second interleaver pattern is applied to the second transmission,
wherein the specific time is after a successful decoding of the frame and is within the predetermined duration of the frame, and
wherein a first interleaved result of the first transmission is cyclically shifted by one-half a length with respect to a second interleaved result of the second transmission.

7. A method of transmitting by a base station to a mobile station in a soft handoff in a wireless communication system, the method comprising:
transmitting a transmission within a predetermined duration of a frame; and
receiving an acknowledgement from the mobile station at a specific time,
wherein the base station terminates the transmission earlier than the predetermined duration of the frame, after receiving the acknowledgement,
wherein the transmission and another transmission from another base station facilitate decoding of the frame at the mobile station earlier than the predetermined duration of the frame,
wherein a first interleaver pattern is applied to the transmission,
wherein a second interleaver pattern is applied to the another transmission,
wherein the specific time is after a successful decoding of the frame and is within the predetermined duration of the frame, and
wherein a first interleaved result of the first transmission is cyclically shifted by one-half a length with respect to a second interleaved result of the second transmission.

8. A base station for transmitting to a mobile station in a soft handoff in a wireless communication system, the base station comprising:
a transmitter configured to transmit a transmission within a predetermined duration of a frame; and
a receiver configured to receive an acknowledgement from the mobile station at a specific time,
wherein the base station terminates the transmission earlier than the predetermined duration of the frame, after receiving the acknowledgement,
wherein the transmission and another transmission from another base station facilitate decoding of the frame at the mobile station earlier than the predetermined duration of the frame,
wherein a first interleaver pattern is applied to the transmission,
wherein a second interleaver pattern is applied to the another transmission,
wherein the specific time is after a successful decoding of the frame and is within the predetermined duration of the frame, and
wherein a first interleaved result of the first transmission is cyclically shifted by one-half a length with respect to a second interleaved result of the second transmission.

* * * * *